(12) United States Patent
Wilson et al.

(10) Patent No.: US 10,977,802 B2
(45) Date of Patent: Apr. 13, 2021

(54) MOTION ASSISTED IMAGE SEGMENTATION

(71) Applicant: QUALCOMM Incorporated, San Diego, CA (US)

(72) Inventors: Sunid Wilson, San Diego, CA (US); Ramin Rezaiifar, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 16/116,763

(22) Filed: Aug. 29, 2018

(65) Prior Publication Data
US 2020/0074642 A1    Mar. 5, 2020

(51) Int. Cl.
| | | |
|---|---|---|
| G06T 7/215 | (2017.01) | |
| G06T 7/194 | (2017.01) | |
| G06T 7/11 | (2017.01) | |
| G06T 7/174 | (2017.01) | |

(52) U.S. Cl.
CPC ............... *G06T 7/215* (2017.01); *G06T 7/11* (2017.01); *G06T 7/174* (2017.01); *G06T 7/194* (2017.01); *G06T 2207/10016* (2013.01)

(58) Field of Classification Search
CPC . G06T 7/215; G06T 7/11; G06T 7/174; G06T 2207/10016; G06T 2207/30201; G06T 7/269; G06T 7/10; G06T 7/12; G06T 7/136–7/194
USPC ................................................ 382/173, 180
See application file for complete search history.

(56) References Cited

U.S. PATENT DOCUMENTS

| | | | | |
|---|---|---|---|---|
| 10,089,743 | B1 * | 10/2018 | Kim | ..................... G06K 9/6271 |
| 2002/0186881 | A1 * | 12/2002 | Li | ........................... G06T 11/00 |
| | | | | 382/164 |
| 2005/0058344 | A1 * | 3/2005 | Xu | ........................ H04N 19/21 |
| | | | | 382/173 |
| 2008/0077953 | A1 * | 3/2008 | Fernandez | ............... H04N 7/15 |
| | | | | 725/32 |
| 2019/0087660 | A1 * | 3/2019 | Hare | ....................... G06T 7/248 |
| 2019/0311202 | A1 * | 10/2019 | Lee | ...................... G06K 9/6256 |

OTHER PUBLICATIONS

Crivelli, Tomas, et al. "Robust optical flow integration." IEEE Transactions on Image Processing 24.1 (2014): 484-498. (Year: 2014).*

(Continued)

*Primary Examiner* — Geoffrey E Summers
(74) *Attorney, Agent, or Firm* — Qualcomm Incorporated

(57) ABSTRACT

Techniques and systems are provided for segmenting one or more frames. For example, incremental optical flow maps can be determined between adjacent frames of a plurality of frames. Using the incremental optical flow maps, a cumulative optical flow map can be determined between a first frame of the plurality of frames and a last frame of the plurality of frames. A segmentation mask can be determined using the first frame of the plurality of frames. Foreground pixels of the segmentation mask for the last frame of the plurality of frames can then be adjusted relative to corresponding foreground pixels for the first frame. The foreground pixels can be adjusted using the cumulative optical flow map between the first frame and the last frame of the plurality of frames.

31 Claims, 16 Drawing Sheets

(56) References Cited

OTHER PUBLICATIONS

Chen, Yadang, et al. "Efficient frame-sequential label propagation for video object segmentation." Multimedia Tools and Applications 77.5 (2018): 6117-6133. (Year: 2017).*
Jain, Suyog Dutt, Bo Xiong, and Kristen Grauman. "Pixel objectness." arXiv preprint arXiv: 1701.05349 (2017). (Year: 2017).*
Vijayanarasimhan, Sudheendra, and Kristen Grauman. "Active frame selection for label propagation in videos." European conference on computer vision. Springer, Berlin, Heidelberg, 2012. (Year: 2012).*
Fan, Qingnan, et al. "JumpCut: non-successive mask transfer and interpolation for video cutout." ACM Transactions on Graphics (TOG) 34.6 (2015): 1-10. (Year: 2015).*
Xu, Yu-Syuan, et al. "Dynamic Video Segmentation Network." arXiv preprint arXiv:1804.00931 (2018). (Year: 2018).*
Zhu, Xizhou, et al. "Deep Feature Flow for Video Recognition." 2017 IEEE Conference on Computer Vision and Pattern Recognition (CVPR). IEEE, 2017. (Year: 2017).*

* cited by examiner

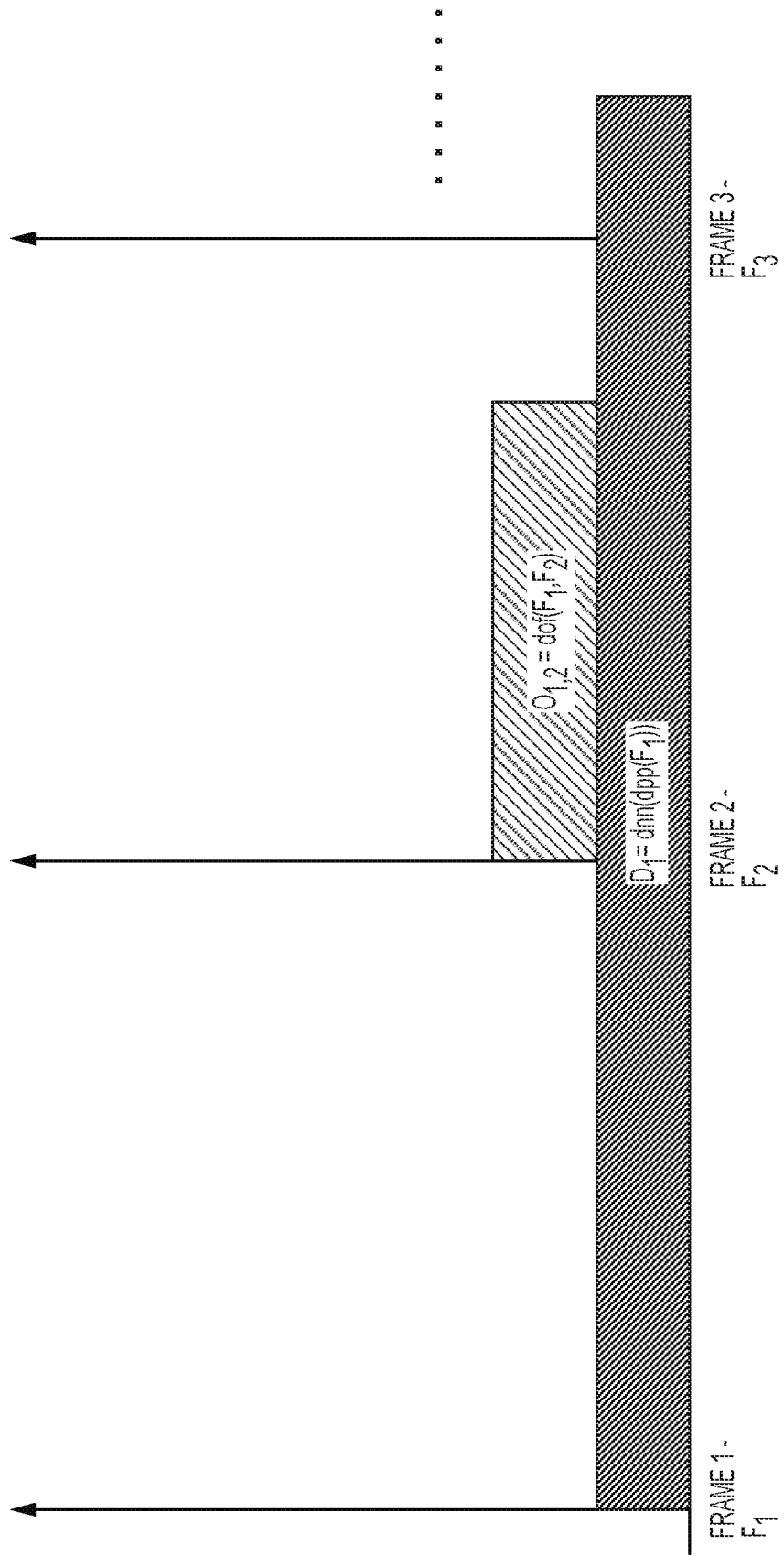

700

```
┌─────────────────────────────────────────────┐
│ DETERMINE INCREMENTAL OPTICAL FLOW MAPS BETWEEN │
│   ADJACENT FRAMES OF A PLURALITY OF FRAMES   │
│                     702                      │
└─────────────────────────────────────────────┘
                      ↓
┌─────────────────────────────────────────────┐
│  DETERMINE A CUMULATIVE OPTICAL FLOW MAP BETWEEN A │
│ FIRST FRAME OF THE PLURALITY OF FRAMES AND A LAST FRAME │
│ OF THE PLURALITY OF FRAMES, THE CUMULATIVE OPTICAL FLOW │
│  MAP BEING DETERMINED USING THE INCREMENTAL OPTICAL │
│                   FLOW MAPS                  │
│                     704                      │
└─────────────────────────────────────────────┘
                      ↓
┌─────────────────────────────────────────────┐
│  DETERMINE A FOREGROUND-BACKGROUND SEGMENTATION │
│ MASK USING THE FIRST FRAME OF THE PLURALITY OF FRAMES │
│                     706                      │
└─────────────────────────────────────────────┘
                      ↓
┌─────────────────────────────────────────────┐
│    ADJUST FOREGROUND PIXELS OF THE FOREGROUND- │
│ BACKGROUND SEGMENTATION MASK FOR THE LAST FRAME OF │
│    THE PLURALITY OF FRAMES RELATIVE TO CORRESPONDING │
│  FOREGROUND PIXELS IN THE FIRST FRAME, THE FOREGROUND │
│ PIXELS BEING ADJUSTED USING THE CUMULATIVE OPTICAL FLOW │
│   MAP BETWEEN THE FIRST FRAME AND THE LAST FRAME OF THE │
│                PLURALITY OF FRAMES           │
│                     708                      │
└─────────────────────────────────────────────┘
```

FIG. 7

4 × 4 Feature Map
loc : $\Delta(cx, cy, w, h)$
conf : $(c_1, c_2, \ldots, c_p)$

8 × 8 Feature Map

Image with GT Boxes

MOTION ASSISTED IMAGE SEGMENTATION

FIELD

The present disclosure generally relates to techniques and systems for segmenting images into foreground and background portions, and more specifically to motion assisted image segmentation.

BACKGROUND

Many devices and systems allow a scene to be captured by generating image and/or video data of the scene. For example, a camera can be used to capture images of a scene for recreational use, for professional photography, for surveillance, among other applications. The image data from image capture devices and systems can be captured and output for processing and/or consumption.

Images can be segmented into foreground and background portions using various techniques. Visual effects can then be added to the images using the segmentation information. For example, the background portion and/or the foreground portion of the scene in an image can be modified. Effective techniques are needed for accurately segmenting images into foreground and background portions in a timely manner.

BRIEF SUMMARY

In some examples, techniques and systems are described for performing motion assisted image segmentation. The motion assisted image segmentation can segment frames using incremental optical flow. For instance, a segmentation mask for one or more intermediate frames can be interpolated using incremental optical flow. In one illustrative example, an image segmentation process can obtain a frame, and can begin processing the frame in order to determine a segmentation mask for the frame. In some examples, the segmentation mask indicates which pixels in the frame are foreground pixels corresponding to an object of interest and which pixels are background pixels. In some cases, the segmentation mask can include indications of other pixels (other than foreground and background pixels).

In some cases, the frame can be segmented using a trained deep learning neural network. Due to the complex nature of image segmentation using a neural network, the image segmentation process can take a certain amount of time (corresponding to a frame duration or a number of frames) to complete the image segmentation for the obtained frame. As additional frames (which can be referred to as intermediate frames) are captured while image segmentation is being performed on the obtained frame, the incremental optical flow can be used to determine movement of pixels between the frames until the image segmentation process has completed for the obtained frame. The optical flow can then be used to update the segmentation mask from the segmentation process once the process is completed a number of frames later. By using incremental optical flow to update the segmentation mask, the systems can achieve real-time performance.

In some cases, cumulative optical flow can be determined based on the incremental optical flow. For instance, the systems and techniques can compute incremental dense optical flow maps between sets of adjacent frames. Two adjacent frames can include two directly adjacent frames that are consecutively captured frames (e.g., frames $f\_n$ and $f\_\{n-1\}$) or two frames that are a certain distance apart (e.g., within two frames of one another, or other suitable distance) in a sequence of frames. The incremental dense optical flow maps can be used to compute a cumulative dense optical flow map between a number of frames that are needed to complete the image segmentation process for a segmentation frame (e.g., between frames $f\_8$ and $f\_0$ assuming eight frames are needed to complete image segmentation). As used herein, a segmentation frame is any frame for which image segmentation is performed. For example, the cumulative optical flow can be obtained by computing the sum of the optical flow vectors from the sets of adjacent frames. Once generated at a later frame (e.g., at frame $f\_8$), a dense segmentation mask from the image segmentation process can be morphed (or adjusted) for the later frame using optical flow vectors from the cumulative dense optical flow map. For example, the foreground pixels of the segmentation mask can be adjusted according to the optical flow vectors.

The adjusted segmentation mask can be used to generate an output frame with a modified visual effect. For example, background pixels of the output frame can be identified using the segmentation mask, and can be modified using a variable set of parameters. In one illustrative example, the background pixels of the frame can be blurred out, blacked out, or applied with any other suitable effect. In another example, the foreground pixels of the output frame can be identified using the segmentation mask, and can be replaced with a computer-generated object, an augmented reality (AR) object, or other suitable object.

According to at least one example, a method of segmenting one or more frames is provided. The method includes determining incremental optical flow maps between adjacent frames of a plurality of frames. The method further includes determining a cumulative optical flow map between a first frame of the plurality of frames and a last frame of the plurality of frames. The cumulative optical flow map can be determined using the incremental optical flow maps. The method further includes determining a segmentation mask using the first frame of the plurality of frames. The method further includes adjusting foreground pixels of the segmentation mask for the last frame of the plurality of frames relative to corresponding foreground pixels in the first frame. The foreground pixels can be adjusted using the cumulative optical flow map between the first frame and the last frame of the plurality of frames.

In another example, an apparatus for segmenting one or more frames is provided that includes a memory configured to store the plurality of images and a processor. The processor is configured to and can determine incremental optical flow maps between adjacent frames of a plurality of frames. The processor is further configured to and can determine a cumulative optical flow map between a first frame of the plurality of frames and a last frame of the plurality of frames. The cumulative optical flow map can be determined using the incremental optical flow maps. The processor is further configured to and can determine a segmentation mask using the first frame of the plurality of frames. The processor is further configured to and can adjust foreground pixels of the segmentation mask for the last frame of the plurality of frames relative to corresponding foreground pixels in the first frame. The foreground pixels can be adjusted using the cumulative optical flow map between the first frame and the last frame of the plurality of frames.

In another example, a non-transitory computer-readable medium is provided that has stored thereon instructions that, when executed by one or more processors, cause the one or more processor to: determine incremental optical flow maps between adjacent frames of a plurality of frames; determine a cumulative optical flow map between a first frame of the plurality of frames and a last frame of the plurality of frames, the cumulative optical flow map being determined using the incremental optical flow maps; determine a segmentation mask using the first frame of the plurality of frames; and adjust foreground pixels of the segmentation mask for the last frame of the plurality of frames relative to corresponding foreground pixels in the first frame, the foreground pixels being adjusted using the cumulative optical flow map between the first frame and the last frame of the plurality of frames.

In another example, an apparatus for segmenting one or more frames is provided. The apparatus includes means for determining incremental optical flow maps between adjacent frames of a plurality of frames. The apparatus further includes means for determining a cumulative optical flow map between a first frame of the plurality of frames and a last frame of the plurality of frames. The cumulative optical flow map can be determined using the incremental optical flow maps. The apparatus further includes means for determining a segmentation mask using the first frame of the plurality of frames. The apparatus further includes means for adjusting foreground pixels of the segmentation mask for the last frame of the plurality of frames relative to corresponding foreground pixels in the first frame. The foreground pixels can be adjusted using the cumulative optical flow map between the first frame and the last frame of the plurality of frames.

In some aspects, determining the incremental optical flow maps includes: obtaining a first frame, a second frame, and a third frame; determining a first optical flow map by determining optical flow vectors between pixels of the first frame and pixels of the second frame; and determining a second optical flow map by determining optical flow vectors between the pixels of the second frame and pixels of the third frame.

In some aspects, determining the cumulative optical flow map includes: determining cumulative optical flow vectors between the pixels of the first frame and the pixels of the third frame by computing a sum of the optical flow vectors between the pixels of the first frame and the pixels of the second frame and the optical flow vectors between the pixels of the second frame and the pixels of the third frame. In some examples, an incremental optical flow map is determined between each set of adjacent frames of the plurality of frames. In some examples, a cumulative optical flow map is determined at each frame of the plurality of frames following the second frame.

In some aspects, determining the segmentation mask using the first frame of the plurality of frames takes the plurality of frames to complete. For example, the segmentation mask can be completed using the first frame after receipt of last frame. In another example, the segmentation mask can be completed using the first frame after a frame preceding the last frame is processed.

In some aspects, the segmentation mask is determined using a neural network trained to segment foreground pixels of a frame from background pixels of the frame.

In some aspects, adjusting the foreground pixels of the segmentation mask includes remapping the foreground pixels of the segmentation mask to new pixel locations. The new pixel locations can be determined using optical flow vectors of the cumulative optical flow map.

In some aspects, the incremental optical flow maps and the cumulative optical flow map include an optical flow vector for each pixel of the plurality of frames.

In some aspects, the methods, apparatuses, and computer-readable medium described above further comprise rendering an output frame. The foreground pixels of the output frame correspond to the adjusted foreground pixels of the segmentation mask. In some examples, background pixels of the output frame are modified. In some examples, the foreground pixels of the output frame are modified. In some examples, the background pixels and the foreground pixels of the output frame are modified.

In some aspects, the methods, apparatuses, and computer-readable medium described above further comprise updating the cumulative optical flow map between the first frame of the plurality of frames and a current frame. The updated cumulative optical flow map can be used to adjust the foreground pixels of the segmentation mask for the current frame.

In some aspects, the methods, apparatuses, and computer-readable medium described above further comprise determining an additional cumulative optical flow map between the last frame of the plurality of frames and a current frame. The additional cumulative optical flow map can be used to adjust foreground pixels of an additional segmentation mask. The additional segmentation mask can be determined using the last frame of the plurality of frames.

In some aspects, the methods, apparatuses, and computer-readable medium described above further comprise: updating the cumulative optical flow map between the first frame of the plurality of frames and a current frame; and determining an additional cumulative optical flow map between the last frame of the plurality of frames and the current frame, the additional cumulative optical flow map being used to adjust foreground pixels of an additional segmentation mask, wherein the additional segmentation mask is determined using the last frame of the plurality of frames. In some examples, the cumulative optical flow map is updated and the additional cumulative optical flow map is determined in parallel for the current frame.

In some aspects, the apparatus comprises a mobile device. In some examples, the apparatus comprises one or more of a camera for capturing the one or more frames and a display for displaying one or more output frames. For example, the apparatus can include the camera, the display, or both the camera and the display. In some cases, the apparatus can include multiple cameras for capturing frames.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 6A is a timing diagram illustrating an example of the image segmentation process described herein, in accordance with some examples;

FIG. 7 is a flowchart illustrating an example of a process for segmenting one or more frames, in accordance with some examples;

DETAILED DESCRIPTION

Figure 1:
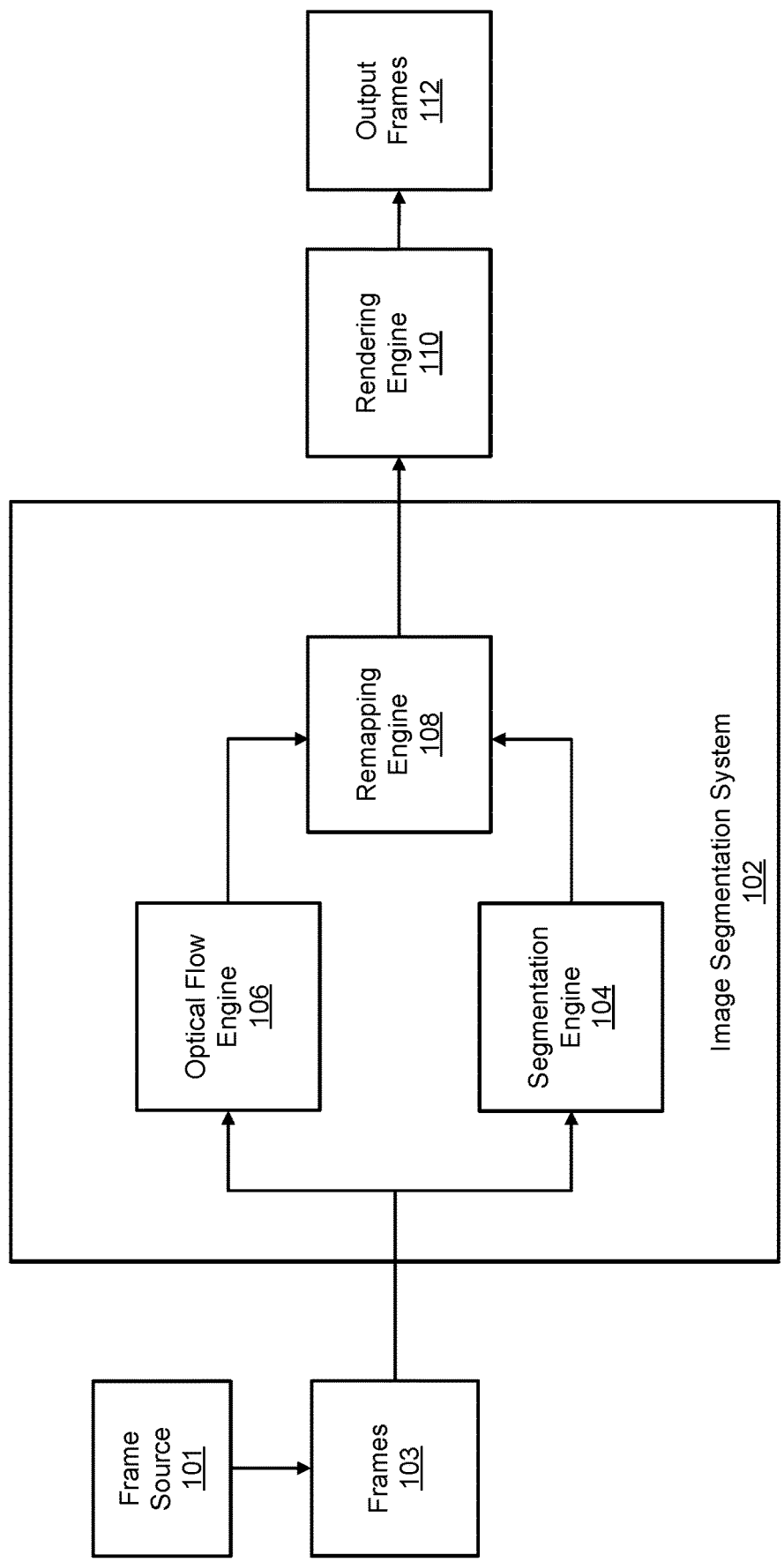
FIG. 1 is a block diagram illustrating an example of an image segmentation system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Still images and video frames can be segmented into foreground and background portions using various techniques. In some cases, depth-mapping techniques can generate and use depth maps to determine which portion of a frame is foreground. For instance, data from a wide angle lens and data from a telephoto lens can be used to generate a depth map. The depth can then be used to manipulate certain objects in the frame. For example, background objects can be artificially blurred depending on how far they are from an in-focus object of interest.

Machine learning can also be used to generate a segmentation mask that indicates which pixels in a frame are foreground pixels and which pixels are background pixels. For example, a deep neural network can be trained by inputting into the neural network many images that have a foreground object of interest and providing a known output for the input images. The input images can be annotated with an indication that a portion in each image is a foreground object of interest. The known output of the neural network can include a segmentation mask. In some examples, the segmentation mask can include a first value for pixels that belong to an object of interest and a second value for pixels that belong to the background. Using machine learning allows for high image segmentation using a single camera, whereas many depth-based techniques require multiple cameras. Visual effects can be added to the frames using the segmentation information. For example, the background portion and/or the foreground portion of the scene in a frame can be modified.

Image segmentation is a complex process that can take several image frames to complete for a given frame. For instance, a deep learning based image segmentation inference can run at 3-5 frames per second (fps) on a graphics processing unit (GPU), digital signal processor (DSP), or any Multicore CPU at maximum frequencies. In such cases, the deep learning network may take 200 to 300 milliseconds (ms) to generate the segmentation mask, which corresponds to approximately 6 to 10 frames in a 30 fps video sequence. The complexity of the neural network model could be reduced in order to speed up the image segmentation process. However, reducing the computation and complexity of the neural network model degrades the quality of the resulting image segmentation.

Systems, methods, and computer-readable media are described herein for segmenting frames using incremental optical flow. Using the incremental optical flow to update the segmentation mask, as described herein, allows real-time (e.g., 30 frames per second (fps) or higher fps) image segmentation and generation of frames with modified visual effects to be achieved.

FIG. 1 is a diagram illustrating an example of an image segmentation system 102. The image segmentation system 102 includes various components, including a segmentation engine 104, an optical flow engine 106, and a remapping engine 108. A rendering engine 110 is also shown as being in communication with the image segmentation system 102. In some implementations, the rendering engine 110 can be part of the image segmentation system 102. The components of the image segmentation system 102 can include electronic circuits or other electronic hardware, which can include one or more programmable electronic circuits (e.g., microprocessors, graphics processing units (GPUs), digital signal processors (DSPs), central processing units (CPUs), or other suitable electronic circuits), computer software, firmware, or any combination thereof, to perform the various operations described herein. In one illustrative example, the operations of the segmentation engine 104 can be implemented using a GPU and/or a DSP, the operations of the optical flow engine 106 can be implemented using a CPU, and the operations of the rendering engine 110 can be implemented using a GPU.

While the image segmentation system 102 is shown to include certain components, one of ordinary skill will appreciate that the image segmentation system 102 can include more or fewer components than those shown in FIG. 1. For example, the image segmentation system 102 may also include, in some instances, one or more memory (e.g., RAM, ROM, cache, buffer, and/or the like) and/or processing devices that are not shown in FIG. 1.

Multiple frames (e.g., frames 103) can be processed by the components of the image segmentation system 102 to provide an adjusted segmentation mask and, in some cases, an output frame that has a desired visual effect. A frame can include a video frame of a video sequence or a still image of a set of consecutively captured still images. In one illustrative example, a set of consecutively captured still images can be captured and displayed to the user as a preview of what is in the field-of-view of the camera, which can help the user decide when to capture an image for storage. In another illustrative example, a set of consecutively captured still images can be captured using a burst mode or other similar mode that captures multiple consecutive images. A frame can be a red-green-blue (RGB) frame having red, green, and blue color components per pixel, a luma, chroma-red, chroma-blue (YCbCr) frame having a luma component and two chroma (color) components (chroma-red and chroma-blue) per pixel, or any other suitable type of color or monochrome picture. In some examples, the image segmentation process can be performed in response to one or more image frames being captured by a camera or a computing device that includes a camera (e.g., a mobile device, or the like), where the desired visual effect is selected for application to the captured one or more frames. In one illustrative example, the image segmentation process can be invoked in response to selection of a shutter button, one or more graphical icons that cause a frame to be captured with the visual effect, and/or other selection option of a camera or computing device.

Figure 2:
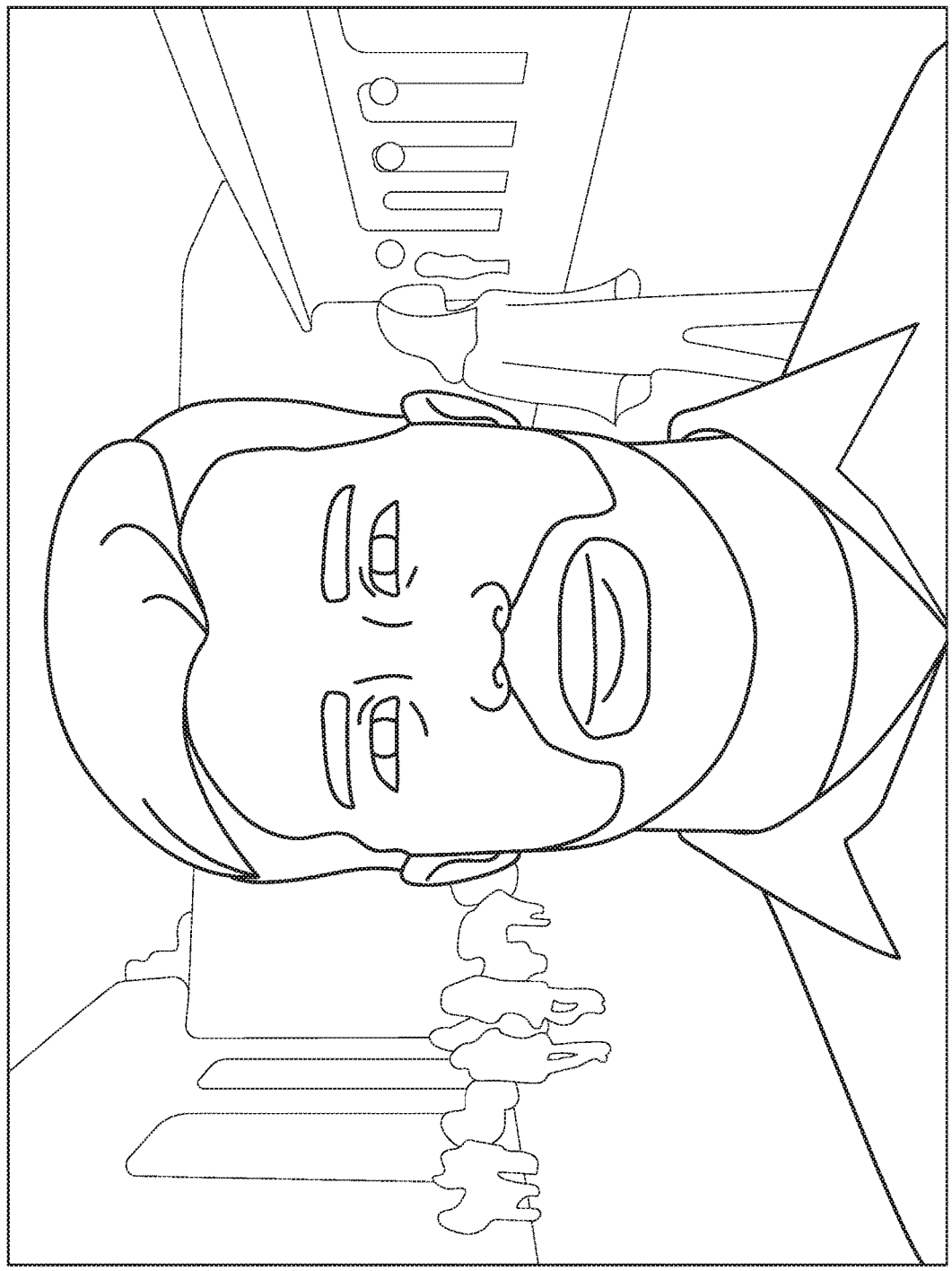
FIG. 2 is a photograph illustrating a frame with a foreground subject and a blurred background, in accordance with some examples.

The visual effect can include the background pixels of the frame being blurred out, being blacked out, being changed to a different color, being replaced with a different background, having an adjusted lighting and/or color characteristic, and/or applied with any other suitable effect. FIG. 2 shows an example of an output frame 200 with a foreground object (a person's face) in focus and the background blurred out. In another example, the visual effect can include modifying the foreground pixels (e.g., changing the lighting, blurring, or the like) of the output frame or replacing the foreground pixels with a different object, such as a computer-generated object, an augmented reality (AR) object, or other suitable object.

The frame source 101 from which the frames 103 are received can include one or more image capture devices and/or one or more video capture devices (e.g., a digital camera, a digital video camera, a phone with a camera, a tablet with a camera, or other suitable capture device), an image and/or video storage device, an image and/or video archive containing stored images, an image and/or video server or content provider providing image and/or video data, an image and/or video feed interface receiving images from a video server or content provider, a computer graphics system for generating computer graphics image and/or video data, a combination of such sources, or other source of image frame content. In some cases, multiple frame sources can provide frames to the image segmentation system 102.

The image segmentation system 102 (and rendering engine 110) can be part of a computing device or multiple computing devices. In some cases, the computing device (or devices) that includes the image segmentation system 102 can also include one or more wireless transceivers for wireless communications and/or a display for displaying one or more images. In some examples, the computing device that includes the image segmentation system 102 can be an electronic device, such as a camera (e.g., a digital camera, an IP camera, a video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device. In some implementations, the image segmentation system 102 and the frame source 101 can be part of the same computing device. For example, in some cases, a camera, phone, tablet, and/or other device with a frame or image source (e.g., a camera, storage, or the like) can include an integrated image segmentation system. In some implementations, the image segmentation system 102 and the frame source 101 can be part of separate computing devices. In one illustrative example, the frame source 101 can include one or more cameras, and the computing device including the image segmentation system 102 can include a mobile or stationary telephone handset, a desktop computer, a laptop or notebook computer, a tablet computer, or other computing device.

In some examples, the image segmentation process performed by the image segmentation system 102 can be performed using a single camera system of a computing device. In other examples, the image segmentation performed by the image segmentation system 102 can be performed using a dual camera system of a computing device. In some cases, more than two cameras can be used in a camera system for performing the image segmentation process.

The segmentation engine 104 of the image segmentation system 102 can process a frame to generate a segmentation mask. For example, a segmentation frame M from a sequence of frames (e.g., frames 103) can be processed by the segmentation engine 104 in order to determine a segmentation mask for the segmentation frame M. As noted previously, a segmentation frame, as used herein, is any frame for which image segmentation is performed.

Figure 3:
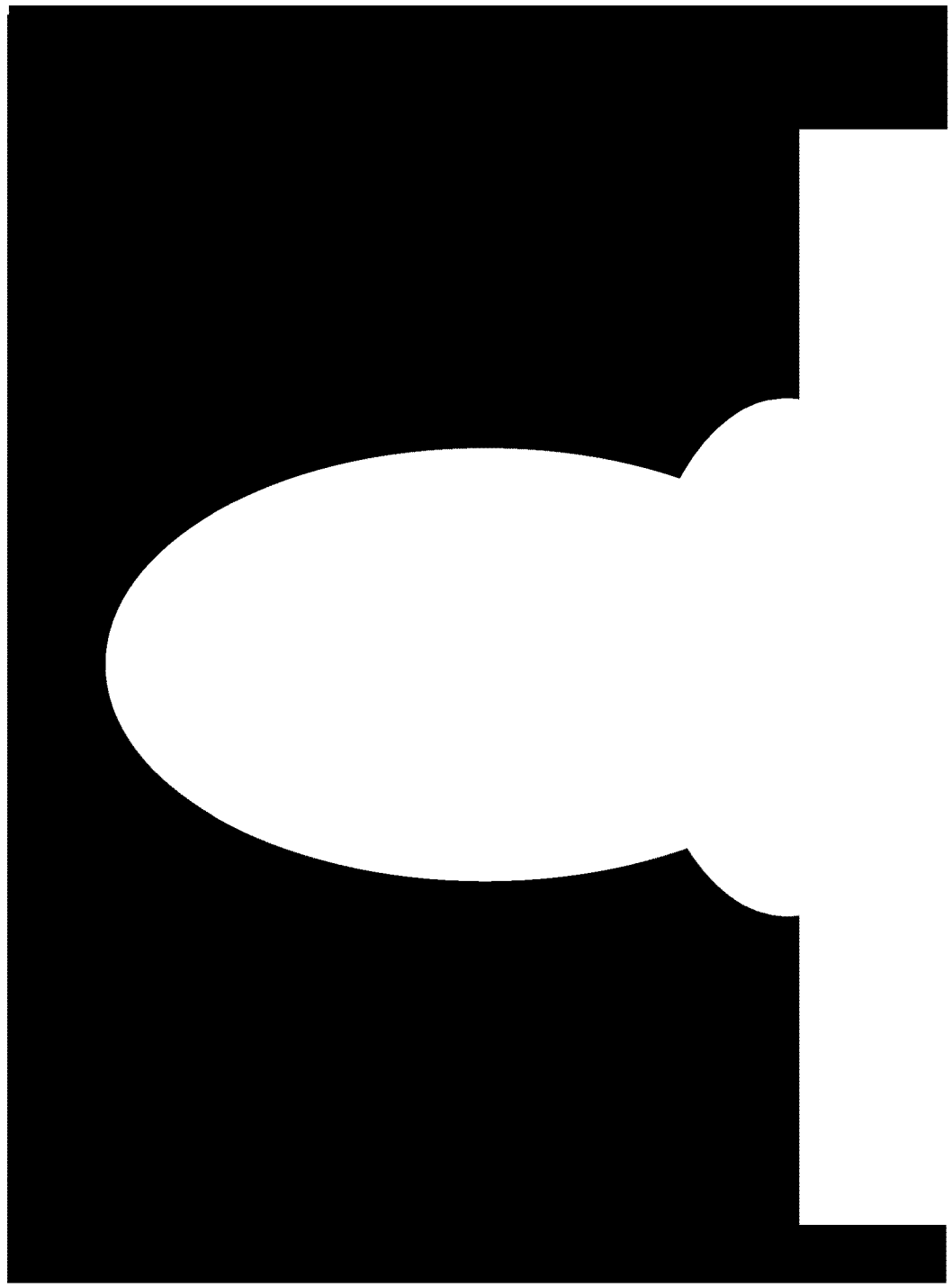
FIG. 3 is a conceptual image illustrating an example of a segmentation mask, in accordance with some examples.

FIG. 3 shows an example of a segmentation mask 300 with foreground pixels (shown with a white color) that correspond to the person in the frame 200 shown in FIG. 2. The segmentation mask 300 can indicate which pixels in the frame are foreground pixels and which pixels are background pixels. For instance, the segmentation mask 300 can include a first value (e.g., a value of 255, 1, or other suitable value) for pixels that belong to the person and a second value (e.g., a value of 0) for pixels that belong to the background. The first value (e.g., a 255) can correspond to a white color, in which case pixels corresponding to the object of interest are white. In such cases, the second value (e.g., a 0) can correspond to a black color, in which case pixels corresponding to the background are black. In some cases, a segmentation mask can include indications of other pixels (other than foreground and background pixels), such as pixels belonging to transition regions between foreground and background pixels, pixels belonging to classified objects other than an object of interest (e.g., a person) when a classification neural network is used to segment the frame, or the like. For example, as described in more detail below, a neural network can be used to perform the image segmentation. In some cases, the neural network can include a classification network that is trained to identify multiple classes of objects, where one of the object classes is an object of interest (e.g., a person, a vehicle, or other suitable object of interest). In such cases, the segmentation mask can include a value for each pixel indicating to which class each pixel belongs.

As noted above, the segmentation engine 104 can perform a deep learning based image segmentation (using a deep neural network) in some cases. The complex nature of deep learning based image segmentation can cause the segmentation process to take a relatively large amount of time (corresponding to a certain frame duration or a certain number of frames) to complete for the segmentation frame being processed. In one illustrative example, the segmentation engine 104 may take 3-5 frames per second (fps) to complete image segmentation for one segmentation frame. Illustrative examples of deep neural networks are described below with respect to FIG. 15-FIG. 18C. For illustrative purposes, it can be assumed that a deep neural network (DNN) based image segmentation inference takes N frames to complete, and the DNN output segmentation mask $D_M$ generated for the segmentation frame M is given by $D_M = dnn(F_M)$ when the frame itself is input into the segmentation engine 104, where $F_M$ represents frame M. The term N can be any suitable number of frames based on the complexity of the neural network. For example, N can be equal to eight frames. One of ordinary skill will appreciate that the segmentation process may take different numbers of frames to complete image segmentation for different segmentation frames, and that the value of N may vary for different segmentation frames.

In some cases, the segmentation frame M can be preprocessed to help with the image segmentation process. Preprocessing of the frame M can include normalization of each color channel (e.g., each R, G, and B color channel or the like), low-light image processing for low light images (e.g., histogram equalization, contrast enhancement, image filtering, and/or any other suitable technique), among other preprocessing techniques. The DNN output segmentation mask $D_M$ is given by $D_M = dnn(P_M)$ when the segmentation frame M is preprocessed before being input to the segmentation engine 104, where $P_M$ represents the preprocessed output of frame M. Based on the above assumption, the execution of $dnn(F_M)$ or $dnn(P_M)$) takes N frames to complete.

The delay in completing the image segmentation process can lead to quality issues, such as when a real-time preview of the scene being captured is viewed by a user. For example, by the time the image segmentation for the segmentation frame is completed, the scene being captured by the computing device may be different than the scene captured by the segmentation frame. In one illustrative example, if a user is pointing a rear facing camera at another person and wants to capture a picture of the person with the background blurred or blacked out, the person may have slightly moved by the time the image segmentation has completed. In such an example, there may be a lag between what is captured and what is viewed.

Incremental optical flow can be determined and used to compensate for the delay in completing the image segmentation process for a segmentation frame. For example, as additional frames are captured while image segmentation is being performed on the segmentation frame, the optical flow engine 106 can compute incremental optical flow maps for the additional frames. The optical flow between the frames can be used to determine movement of pixels between the frames until the image segmentation process has completed for the segmentation frame. The dense optical flow maps can include a vector for each pixel in a frame, where each vector indicates a movement of a pixel between the frames. For instance, a dense optical flow can be computed between adjacent frames to generate optical flow (OF) vectors, which can be included in a dense optical flow map. Each optical flow map can include a two-dimensional (2D) vector field, with each vector being a displacement vector showing the movement of points from a first frame to a second frame.

The incremental dense optical flow maps can be computed between adjacent frames of the additional frames (e.g., between sets of adjacent frames f_n and f_{n−1}). Two adjacent frames can include two directly adjacent frames that are consecutively captured frames or two frames that are a certain distance apart (e.g., within two frames of one another, within three frames of one another, or other suitable distance) in a sequence of frames. In some implementations, the delta duration between the adjacent frames needs to be equal to or less than 33 ms in order to generate a good estimation for the adjusted segmentation mask. For instance, for a frame sequence having a 30 fps frame rate, adjacent frames may need to be two directly adjacent frames that are approximately 33 ms apart from one another. Even if multiple background objects (objects other than the object of interest that is relatively still) are in motion and move at a rate that is greater than 30 fps, the accuracy of the flow of the pixels corresponding to those objects will be irrelevant and will not affect the accuracy of the adjusted segmentation mask because those pixels will be treated as background and set as zero by the segmentation engine 104. The dense optical flow between adjacent frames can be computed in less than one frame time. For instance, dense optical flow can takes 14-18 ms when executed at a lower resolution than the mask generation (e.g., using less than QVGA resolution or other suitable resolution for optical flow), which is approximately 50% of the frame time (~33 ms) when the frames are captured at 30 fps.

Optical flow from frame M ($F_M$) to frame M+1 ($F_M+1$) is given by $O_{M,M+1}=\text{dof}(F_M, F_M+1)$, where dof is the dense optical flow. Any suitable optical flow process can be used to generate the optical flow maps. In one illustrative example, a pixel I(x, y, t) in the segmentation frame M can move by a distance (Δx, Δy) in a next frame M+t taken after a certain time Δt. Assuming the pixels are the same and the intensity does not change between the segmentation frame M and the next frame M+t, the following equation can be assumed:

$$I(x,y,t)=I/(x+\Delta x, y+\Delta y, t+\Delta t) \quad \text{Equation (1).}$$

By taking the Taylor series approximation of the right-hand side of Equation (1) above, and then removing common terms and dividing by Δt, an optical flow equation can be derived:

$$f_x u + f_y v + f_t = 0, \quad \text{Equation (2),}$$

where:

$$f_x = \frac{df}{dx};$$

$$f_y = \frac{df}{dy};$$

$$f_t = \frac{df}{dt};$$

$$u = \frac{\Delta x}{\Delta t}; \text{ and}$$

$$v = \frac{\Delta y}{\Delta t}.$$

Using the optical flow equation (Equation (2)), the image gradients $f_x$ and $f_y$ can be found along with the gradient along time (denoted as $f_t$). The terms u and v are the x and y components of the velocity or optical flow of I(x, y, t), and are unknown. The optical flow equation cannot be solved with two unknown variables. Any suitable estimation technique can be used to estimate the optical flow. Examples of such estimation techniques include differential methods (e.g., Lucas-Kanade estimation, Horn-Schunck estimation, Buxton-Buxton estimation, or other suitable differential method), phase correlation, block-based methods, or other suitable estimation technique. For instance, Lucas-Kanade assumes that the optical flow (displacement of the image pixel) is small and approximately constant in a local neighborhood of the pixel I, and solves the basic optical flow equations for all the pixels in that neighborhood using the least squares method.

In some cases, the incremental dense optical flow maps can be used to compute a cumulative dense optical flow map between a number of frames that are needed to complete the image segmentation process (e.g., between frames f_8 and f_0 assuming eight frames are needed to complete the image segmentation process). The cumulative optical flow can be obtained by computing the sum of the optical flow vectors from the sets of adjacent frames (e.g., by summing the x-direction optical flow vector values and summing the y-direction vector values). For instance, the cumulative optical flow (cof) from Frame M ($F_M$) to Frame M+P ($F_{M+P}$) is given by $O_{M,M+P}=\text{cof}(O_{M,M+P-1}, O_{M+P-1,M+P})$. In one illustrative example, if the cumulative optical flow for frame 1 through frame 4 is being determined, a dense optical flow map will be determined between each set of adjacent frames—frames 1 and 2, frames 2 and 3, and frames 3 and 4. Once a first optical flow map between frames 1 and 2 and a second optical flow map between frames 2 and 3 are determined, the cumulative optical flow from frame 1 to frame 3 can be determined by summing the optical flow vectors of the first optical flow map with the optical flow vectors from the second optical flow map. When frame 4 is obtained, the cumulative optical flow from frame 1 to frame 3 is already determined. The dense optical flow between frames 3 and 4 can be computed, and an updated cumulative optical flow map can be computed for frame 4 by summing the optical flow vectors of the resulting optical flow map (between frames 3 and 4) with the previously determined cumulative optical flow map (from frame 1 to frame 3).

Figure 4A:
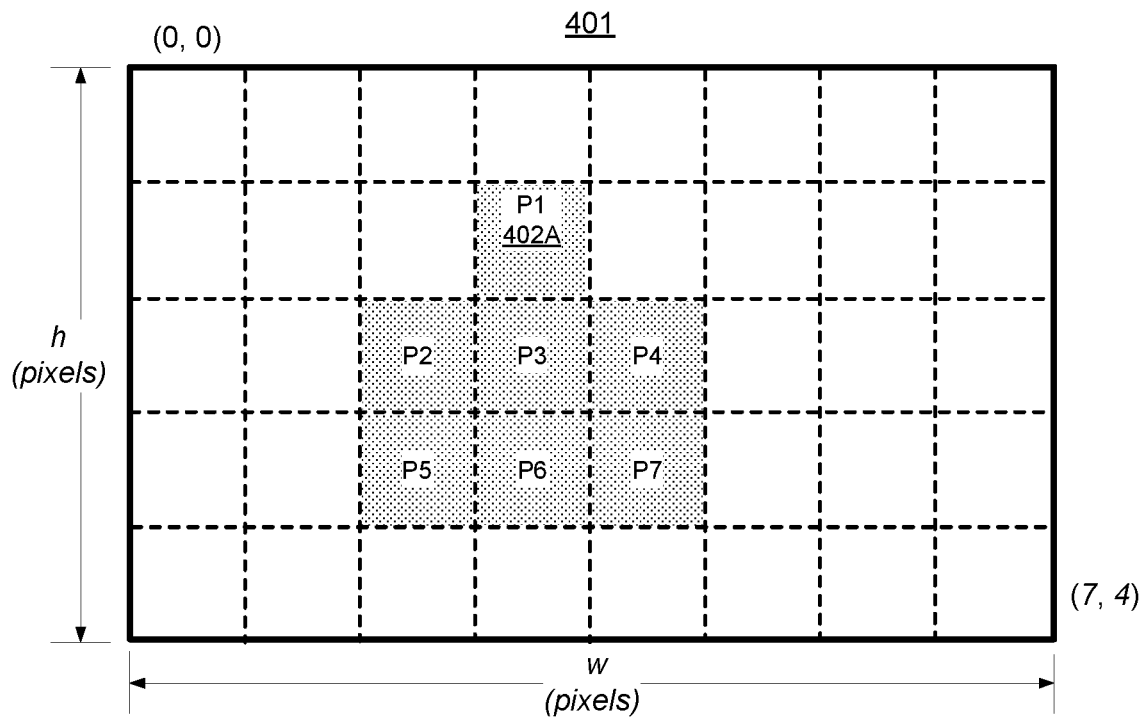
FIG. 4A is a diagram illustrating an example of a frame shown with pixel locations, in accordance with some examples.

FIG. 4A is a diagram illustrating an example of a first frame 401 of a sequence of frames, shown with foreground pixels P1, P2, P3, P4, P5, P6, and P7 (corresponding to an object of interest) at illustrative pixel locations. The other pixels in the first frame 401 can be considered background pixels. The frame 401 is shown with dimensions of w pixels wide by h pixels high (denoted as w×h). One of ordinary skill will understand that the frame 401 can include many more pixel locations than those illustrated in FIG. 4A. For example, the frame 401 can include a 4K (or ultra-high definition (UHD)) frame at a resolution of 3,840×2,160 pixels, an HD frame at a resolution of 1,920×1,080 pixels, or any other suitable frame having another resolution. A pixel P1 is shown at a pixel location 402A. The pixel location 402A can include a (w, h) pixel location of (3, 1) relative to the top-left-most pixel location of (0, 0). The pixel P1 is used for illustrative purposes and can correspond to any suitable point on the object of interest, such as the point of a nose of a person.

Figure 4B:
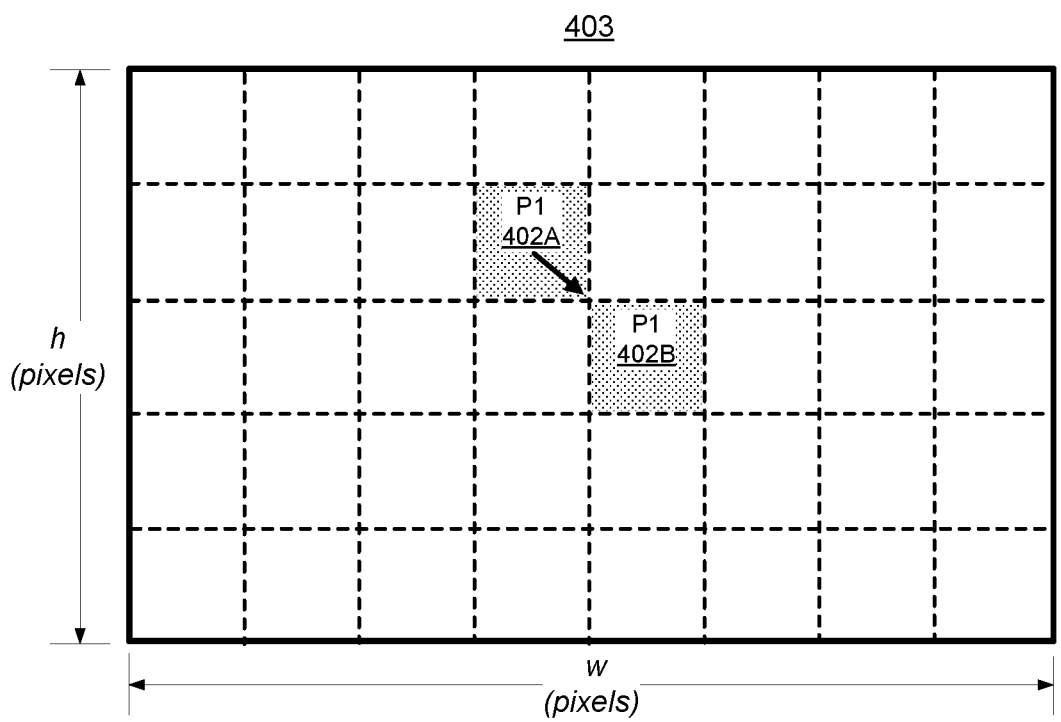
FIG. 4B is a diagram illustrating an example of a next frame shown with updated pixel locations as compared to the frame illustrated in FIG. 4A, in accordance with some examples.

FIG. 4B is a diagram illustrating an example of a second frame 403 that is adjacent to the frame 401. For instance, the second frame 403 can occur immediately after the first frame 401 in the sequence of frames. The second frame 403 has the same corresponding pixel locations as that of the first frame 401 (with dimension w×h). As shown, the pixel P1 has moved from the pixel location 402A in the frame 401 to an updated pixel location 402B in the frame 403. The updated pixel location 402B can include a (w, h) pixel location of (4, 2) relative to the top-left-most pixel location of (0, 0). An optical flow vector can be computed for the pixel P1, indicating the velocity or optical flow of the pixel P1 from the first frame 401 to the second frame 403. In one illustrative example, the optical flow vector for the pixel P1 between the frames 401 and 403 is (1, 1), indicating the pixel P1 has moved one pixel location to the right and one pixel location down.

Figure 4C:
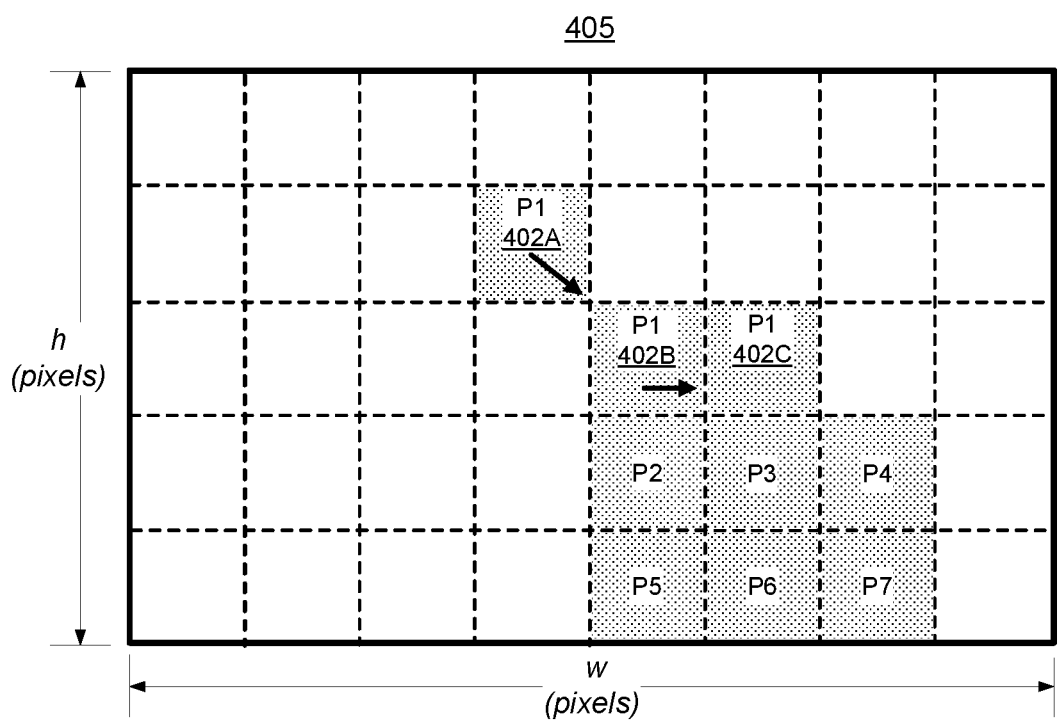
FIG. 4C is a diagram illustrating an example of a next frame shown with updated pixel locations as compared to the frame illustrated in FIG. 4B, in accordance with some examples.

FIG. 4C is a diagram illustrating an example of a third frame 405 that is adjacent to the second frame 403. For instance, the third frame 405 can occur immediately after the second frame 403 in the sequence of frames. The third frame 405 has the same corresponding pixel locations as that of the first frame 401 and the second frame 403 (with dimensions w×h). As shown, the pixel P1 has moved from pixel location 402B in frame 403 to an updated pixel location 402C in the frame 405. The updated pixel location 402C can include a (w, h) pixel location of (5, 2) relative to the top-left-most pixel location of (0, 0). An optical flow vector can be computed for the pixel P1 from the second frame 403 to the third frame 405. In one illustrative example, the optical flow vector for the pixel P1 between the frames 403 and 405 is (1, 0), indicating the pixel P1 has moved one pixel location to the right. The cumulative optical flow for the pixel P1 from the first frame 401 to the third frame 405 can be determined as $O_{1,3}=cof(O_{1,2}, O_{2,3})$. Using the examples from above, the cumulative optical flow vector $O_{1,3}$ has an (x, y) value equal to (2, 1) based on the sum of the x- and y-directions of the optical flow vectors—cof((1, 1), (1, 0))=(1+1, 1+0). A similar cumulative optical flow can be determined for all other pixels in the frames 401, 403, and 405.

In some implementations, the cumulative optical flow can be computed using lower resolution frames than the frames used by the segmentation engine 104 when performing the deep learning based image segmentation. For instance, the frames 103 can be downsampled to a lower resolution before being processed by the optical flow engine 106. In another example, separate frames can be captured for processing by the optical flow engine 106 than the frames that are captured for processing by the segmentation engine 104, where the frames captured for the optical flow engine 106 can have a lower resolution than the frames captured for the segmentation engine 104. In such implementations, one pixel in the lower resolution frames can represent multiple pixels in the segmentation mask output by the segmentation engine 104. In one illustrative example, if the frames processed by the optical flow engine 106 are a quarter of the resolution of the frames processed by the segmentation engine 104, a pixel of the lower resolution frames can represent four pixels of the segmentation mask, which is based on the higher resolution frames. Once the cumulative optical flow is determined by the optical flow engine 106 for the lower resolution frames, the optical flow values of the intermediate pixels in the optical flow path can be interpolated or estimated for performing remapping (described in more detail below). For instance, a lower resolution frame can be upsampled to match the resolution of the frame used by the segmentation engine 104. The pixels of the upsampled frame with known optical flow values can be used to estimate optical flow values of the pixels with unknown optical flow values. Any suitable interpolation or estimation technique can be used, such as bilinear interpolation, Lagrange interpolation, polynomial interpolation, least squares interpolation, and/or any other suitable interpolation or estimation method. The complete set of pixels (after interpolation or estimation) can then be used for obtaining the segmentation mask during the remapping described below.

The optical flow output from the optical flow engine 106 can be used by the remapping engine 108. The remapping engine 108 can use the optical flow to approximate the segmentation mask generated for the segmentation frame M at the later point in time (after N frames) after the image segmentation process is complete. For instance, once the image segmentation process is completed after the N number of frames, the segmentation mask from the segmentation engine 104 can be updated or adjusted for frame N based on the computed optical flow. As noted above, using the optical flow to estimate the segmentation mask at the later frame compensates for the delay in completing the image segmentation process for the segmentation frame M.

In some cases, the cumulative optical flow for frame M (which can be updated at each frame starting from frame M+3, as described above) can be used to update the segmentation mask. For instance, a dense segmentation mask (which can be referred to as an inference segmentation mask) can be output from the segmentation engine 104 and can then be adjusted (e.g., at frame M+8 assuming N=8) using optical flow vectors from the cumulative dense optical flow map (e.g., the cumulative optical flow vectors between frames M and M+8 assuming N=8). In one illustrative example, the segmentation mask for frame N is given by: $M_N$=remap($D_M$, $O_{M,N}$), where $D_M$ is the inference segmentation mask output using frame M (before being remapped), N is the frame at which the segmentation process is completed (where M<N), and $O_{M,N}$ is the cumulative optical flow from frame M to frame N.

Figure 5A:
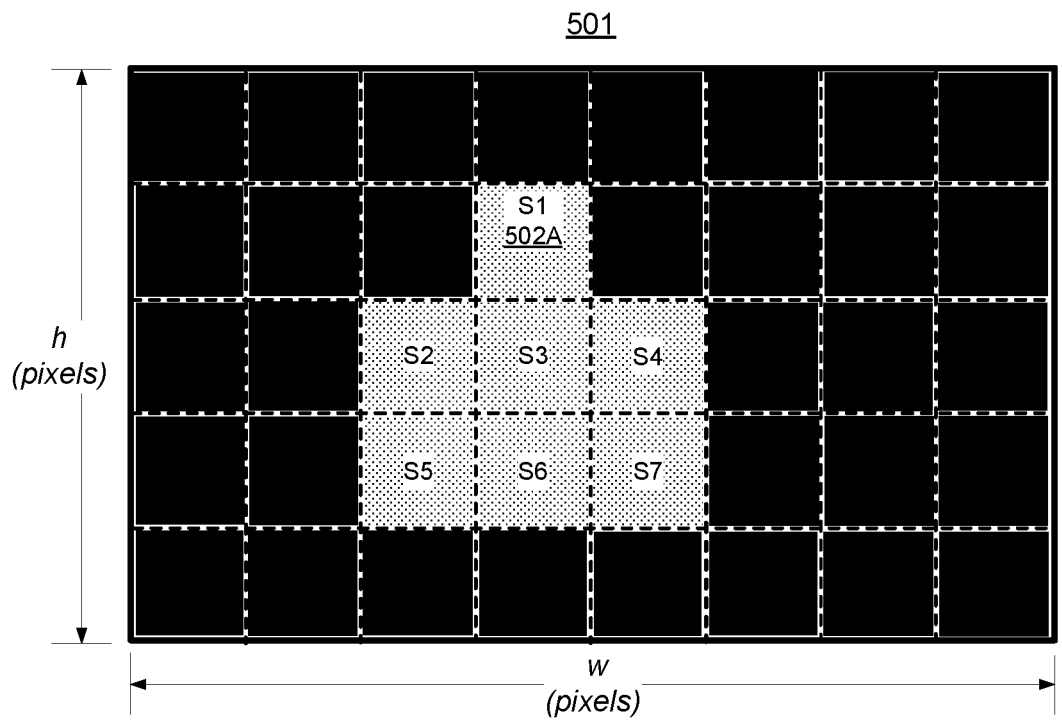
FIG. 5A is a diagram illustrating an example of a segmentation mask shown with foreground and background pixels that correspond to the pixel locations of the frame shown in FIG. 4A, in accordance with some examples.

The segmentation mask can be adjusted by moving foreground pixels of the segmentation mask to new locations according to the cumulative optical flow vectors. FIG. 5A is a diagram illustrating an example of an inference segmentation mask 501. The inference segmentation mask 501 is generated based on the foreground and background pixels of the first frame 401 (which is a segmentation frame) shown in FIG. 4A, and has the same dimensions as that of the first frame 401 (w pixels×h pixels). For example, the segmentation pixels S1, S2, S3, S4, S5, S6, and S7 (e.g., having a value of 1 in the segmentation mask 501) correspond, respectively, to foreground pixels P1, P2, P3, P4, P5, P6, and P7 that represent an object of interest. The other segmentation pixels in the inference segmentation mask 501 are background pixels (e.g., having a value of 0 in the segmentation mask 501). In some cases, as described above, the frame 401 can have a lower resolution than the segmentation mask 501.

Figure 5B:
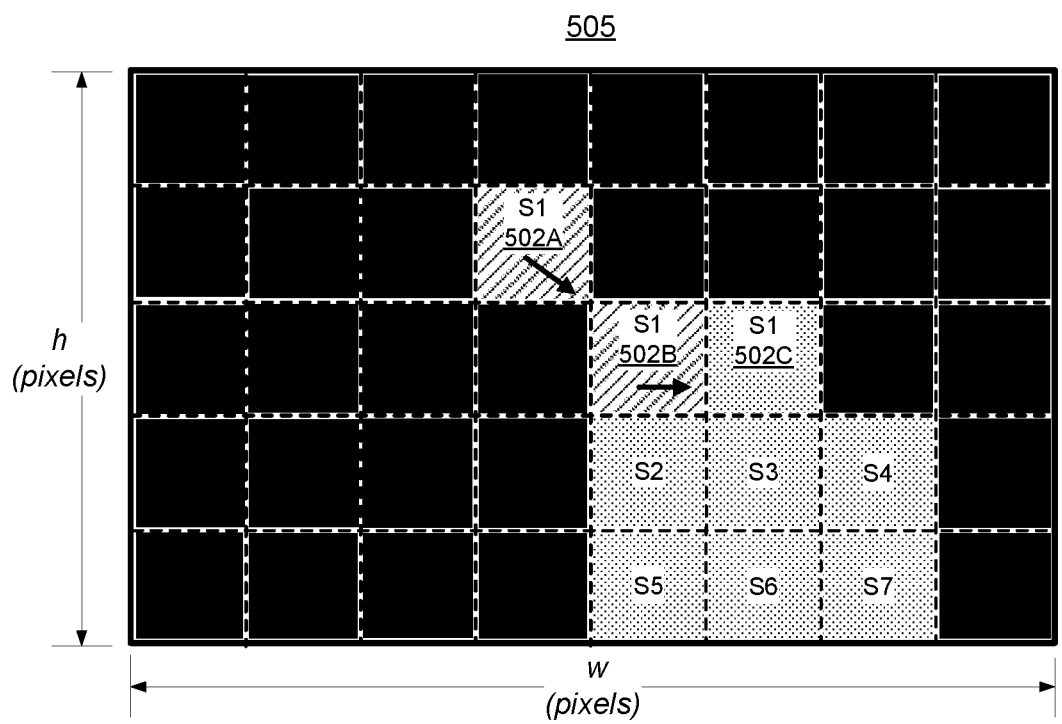
FIG. 5B is a diagram illustrating an example of an adjusted segmentation mask, in accordance with some examples.

FIG. 5B is a diagram illustrating an example of an adjusted segmentation mask 505 that is generated at the frame 405 shown in FIG. 4C. The remapping engine 108 can adjust the segmentation pixels (corresponding to foreground pixels) for frame N (the later frame at which the segmentation process using frame M has completed) by adjusting the locations of the segmentation pixels according to the optical flow vectors generated by the optical flow engine 106. As one example, the segmentation pixel S1 is located in the inference segmentation mask 501 at pixel location 502A, which corresponds to the pixel location 402A of the pixel P1 shown in FIG. 4A. The pixel location 502A can include a (w, h) pixel location of (3, 1) relative to the top-left-most pixel location of (0, 0). As described above, the pixel P1 moved from the pixel location 402A in the frame 401 (pixel location (3, 1)) to an updated pixel location 402C in the frame 405 (pixel location (5, 2)), resulting in a cumulative optical flow vector having an (x, y) value of (2, 1). Applying that cumulative optical flow vector to the segmentation pixel S1, the location of the pixel S1 is moved to the location 502C by adjusting the pixel S1 to the right two pixel locations and down one pixel location. The other segmentation pixels S2, S3, S4, S5, S6, and S7 are also adjusted according to the cumulative optical flow vectors generated for the foreground pixels P2, P3, P4, P5, P6, and P7. Because the other segmentation pixels in the segmentation mask 501 are background pixels, the cumulative optical flow vectors calculated for the corresponding pixels in the frame 401 can be disregarded by the remapping engine 108.

In some cases, when adjusting an inference segmentation mask, an optical flow vector may indicate that a foreground pixel has left the frame or has entered the frame. In such cases, if an optical flow vector for a foreground pixel indicates the pixel is exiting the boundary of the frame, the pixel can be dropped in the adjusted segmentation mask. If an optical flow vector indicates that a new pixel has entered the frame, the pixel can be designated as a foreground pixel or a background pixel based on a centroid (or other point) determined for the object of interest. For example, a distance of each foreground pixel of the object from the centroid can be known, and can be compared against the distance of the new pixel that has entered the frame. If the distance of the new pixel is within a certain distance of the centroid, the pixel can be assigned a foreground pixel value (e.g., a value of 1) in the segmentation mask. Otherwise, the pixel can be assigned a background pixel value (e.g., a value of 0) in the segmentation mask. In some cases, if a pixel moves out of the frame boundary and then comes back into the frame, the path of that pixel can be remembered and updated accordingly.

Adjusted segmentation masks can be used by the rendering engine 110 to generate output frames 112 (e.g., output frame 200) with a modified visual effect. The background pixels and/or the foreground pixels of an output frame can be identified using the segmentation mask. For example, the pixels from the output frame that correspond to segmentation pixels from the segmentation mask that have a background value (e.g., a value of 0) are identified as background pixels. Using FIG. 4C and FIG. 5B as an example, all pixels other than pixels P1, P2, P3, P4, P5, P6, and P7 in the frame 405 are identified as corresponding to the background segmentation pixels (all segmentation pixels other than S1, S2, S3, S4, S5, S6, and S7) from the segmentation mask 505. In some cases, the identified background pixels can be modified using the visual effect. In another example, the pixels from the output frame that correspond to segmentation pixels from the segmentation mask that have a foreground value (e.g., a value of 1) are identified as foreground pixels. In some cases, the foreground pixels can be modified using a visual effect.

Various visual effects can be applied to the background pixels and/or the foreground pixels using a variable set of parameters. In one illustrative example, the output of the renderer is given by $R_N$=render($F_N$, $M_N$, Eparams . . . ), where $F_N$ is the Nth frame, $M_N$ is the adjusted segmentation mask for the Nth frame, and Eparams are the variable set of parameters (which are of variable count, hence the notation " . . . ") for the chosen effect. In some examples, the background pixels of the frame can be blurred out, blacked out, or applied with any other suitable effect. The output frame 200 shown in FIG. 2 is shown with a blurred background, while the foreground object (the person) is in focus. The blur can be applied to the pixels using any suitable technique, such as by convolving a kernel with the image. The kernel can include any suitable blurring kernel, such as a Gaussian blur function (e.g., a 3×3 Gaussian blur kernel, a 5×5 Gaussian blur kernel, or the like), a box blur function (e.g., using a 3×3 kernel or the like), disc blur rendering (circular bokeh, hexagonal bokeh, star bokeh, etc.), or other suitable blurring function. The blur kernel (e.g., Gaussian blur kernel or the like) and the image size are variable based on the intensity requested by the user. In some examples, because large kernels can be computationally intensive, a smaller kernel can be used on a downscaled image, in which case the image can be upscaled after applying the blur kernel. In some examples, the pixels can be blacked out by changing a pixel value of each background pixel to a black color (e.g., to a pixel value of 0 out of a pixel value range of 0-255). In some examples, the foreground pixels of the output frame can be identified using the segmentation mask, and can be replaced with a computer-generated (CG) object, an augmented reality (AR) object, or other suitable object. For example, the face of a user of the computing device can be replaced with an animated animal face, a character from a game, movie, or show, an avatar of the user, or with any other CG or AR object.

Figure 6B:
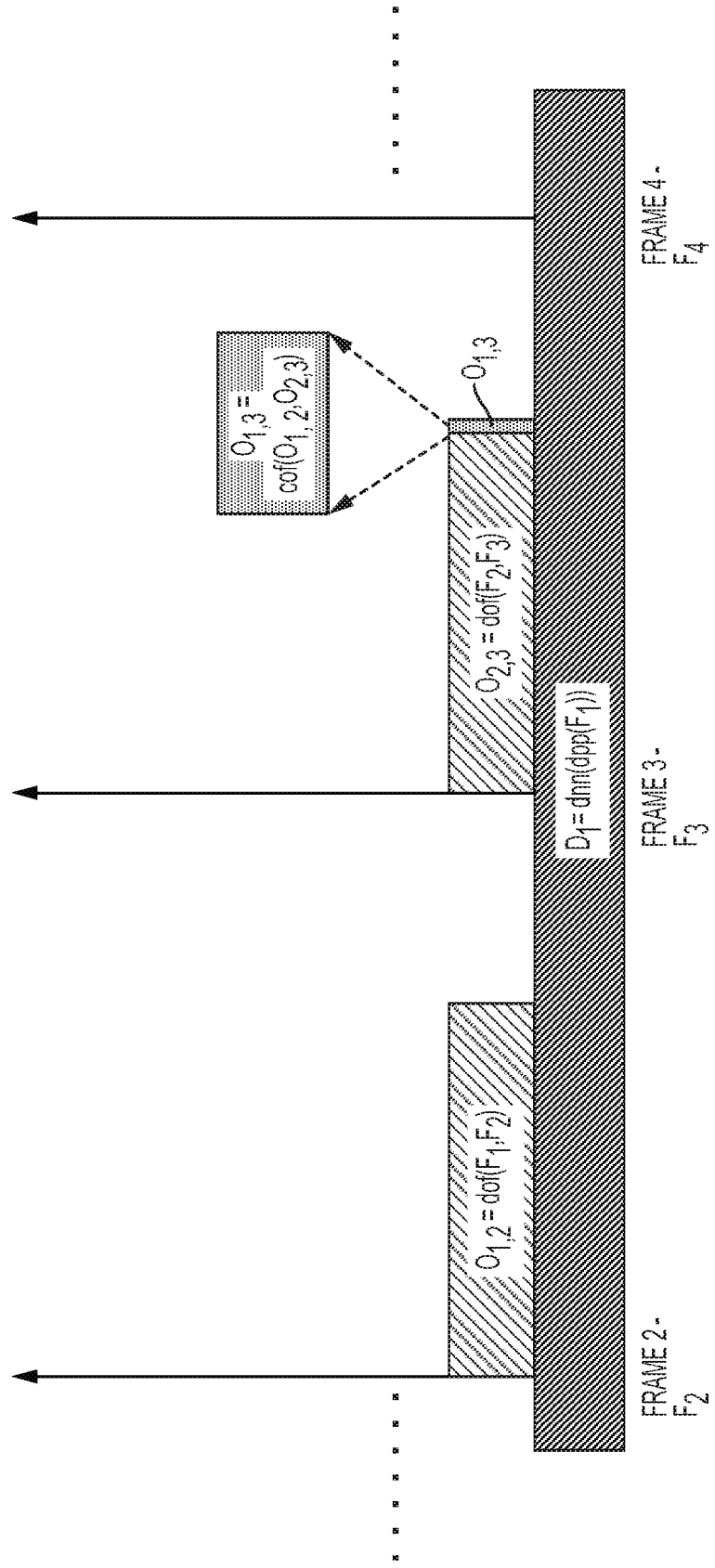
FIG. 6B is a timing diagram further illustrating an example of the image segmentation process described herein, in accordance with some examples.

FIG. 6A-FIG. 6E are timing diagrams illustrating an example of the image segmentation process described above. FIG. 6A is a timing diagram for a first three frames (Frame 1 through Frame 3) of a sequence of frames. Frame 1 ($F_1$) is a segmentation frame for which the segmentation engine 104 applies image segmentation to generate a segmentation mask. For example, the segmentation engine 104 can apply a deep neural network to Frame 1 (denoted as $D_1$=dnn(dpp($F_1$), where dnn refers to the deep neural network, $F_1$ refers to Frame 1, and dpp($F_1$) refers to a preprocessed Frame 1). In some cases, Frame 1 itself can be processed by the deep neural network, instead of being preprocessed before being input to the neural network. In some implementations, another type of image segmentation (other than neural network based) can be used to segment the frames.

The deep neural network takes N frames to complete image segmentation for the Frame 1, in which case incremental optical flow can be determined for frames between Frame 1 and Frame N. For example, as shown in FIG. 6A, a dense optical flow can be determined between Frame 1 and a next frame (Frame 2), which is denoted as $O_{1,2}$=dof($F_1$, $F_2$). FIG. 6B is a timing diagram for Frame 2 ($F_2$) through Frame 4 ($F_4$) of the sequence of frames. As shown, a dense optical flow can be determined between Frame 2 and Frame 3, which is denoted as $O_{2,3}$=dof($F_2$, $F_3$). Starting at Frame 3, a cumulative optical flow can be incrementally determined at each frame. For example, as shown, a cumulative optical flow (cof) map is determined between Frame 1 and Frame 3 (denoted as $O_{1,3}$=cof($O_{1,2}$, $O_{2,3}$)) by summing the dense optical flow map between Frame 1 and Frame 2 with the dense optical flow map between Frame 2 and Frame 3. While not shown in FIG. 6B, a cumulative optical flow map is also determined at Frame 4 by summing the cumulative optical flow map computed at Frame 3 with the dense optical flow map determined between Frame 3 and Frame 4 (denoted as $O_{1,4}=\text{cof}(O_{1,3}, O_{3,4})$). The cumulative optical flow maps can be incrementally determined at each frame, instead of determining a single cumulative optical flow map at Frame N, because it may take too long to compute a single cumulative optical flow map for all frames leading up to Frame N within the time frame of Frame N (within 33 ms of a 30 fps sequence of frames). By incrementally determining the cumulative optical flow maps, the image segmentation system 102 can achieve real-time segmentation (starting from Frame N when the first segmentation map is output). In some implementations, the cumulative optical flow map between Frame 1 and Frame N ($O_{1,N}$) can be determined at Frame N, such as when there is enough time to compute the cumulative optical flow during one frame time (e.g., within 33 ms) or in other cases.

Figure 6C:
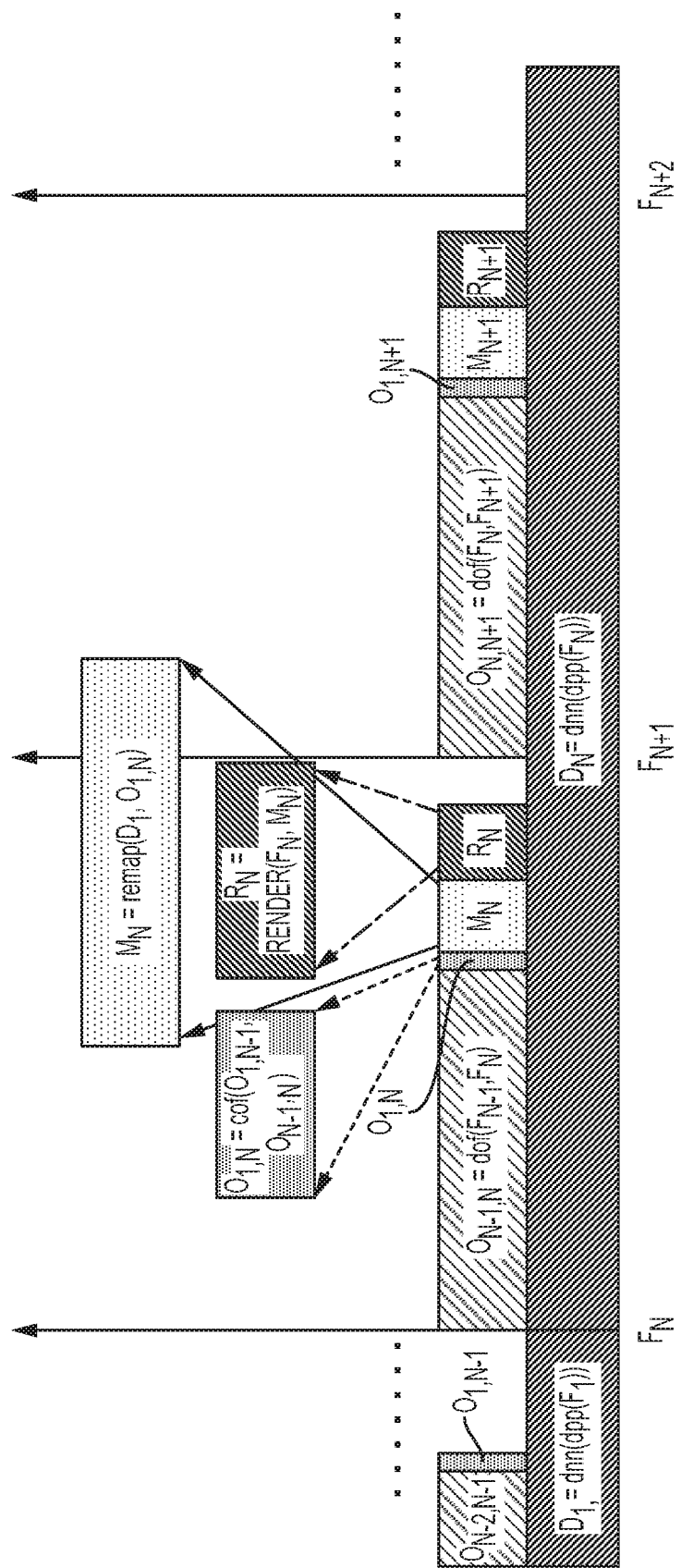
FIG. 6C is a timing diagram further illustrating an example of the image segmentation process described herein, in accordance with some examples.

FIG. 6C is a timing diagram for Frame N ($F_N$) through Frame N+2 ($F_{N+2}$) of the sequence of frames. At Frame N (e.g., after Frame N−1 is processed and/or Frame N is received), the image segmentation process applied to Frame 1 ($D_1=\text{dnn}(\text{dpp}(F_1))$) is complete, and the segmentation mask $D_1$ is output to the remapping engine 108. Once the image segmentation process for Frame 1 has completed, a new segmentation process can be performed on Frame N (denoted as $D_N=\text{dnn}(\text{dpp}(F_N))$). Also at Frame N, a cumulative optical flow map is determined between Frame 1 and Frame N (denoted as $O_{1,N}$). The cumulate optical flow $O_{1,N}$ can be determined by summing the cumulative optical flow map $O_{1,N-1}$ computed from Frame 1 through Frame N−1 with the dense optical flow map $O_{N-1,N}$ computed between Frame N−1 and Frame N (denoted as $O_{1,N}=\text{cof}(O_{1,N-1}, O_{31\ 1,N})$).

The remapping engine 108 can generate the adjusted segmentation mask $M_N$ for the frame N by modifying pixels of the inference segmentation mask $D_1$ using the cumulative optical flow map $O_{1,N}$ (denoted as $M_N=\text{remap}(D_1, O_{1,N})$ in FIG. 6C). For example, the foreground pixels of the inference segmentation mask $D_1$ can be adjusted by moving the pixels to new locations using the cumulative optical flow vectors from $O_{1,N}$, as described above with respect to FIG. 4A-FIG. 5B. The rendering engine 110 can then generate a rendered output frame $R_N$ using the input frame N ($F_N$) and the adjusted segmentation mask $M_N$. The frame $R_N$ can be rendered with an added visual effect (e.g., a blurred background, a blacked out background, or other visual effect), as described above. The rendered output frame $R_N$ can be output for display by a display of the computing device that includes the image segmentation system 102. The dense optical flow $O_{N-1,N}$, the cumulative optical flow $O_{11,N}$, the adjusted segmentation mask $M_N$, and the rendered output frame $R_N$ can all be generated within the time frame of the Frame N (e.g., within 33 ms of a 30 fps sequence of frames), allowing for the image segmentation system 102 to achieve real-time image segmentation and rendered frame output starting from Frame N ($F_N$). For example, as described below with respect to FIG. 6C-FIG. 6E, incremental dense and cumulative optical flow maps can be determined at each frame following Frame N, and can be used to update the segmentation mask at each frame. As used herein, real-time refers to generating an adjusted segmentation mask (e.g., $M_N$) and a rendered output frame (e.g., Frame $R_N$) during the time frame (e.g., 33 ms for 30 fps) of the corresponding input frame (Frame N).

Figure 6D:
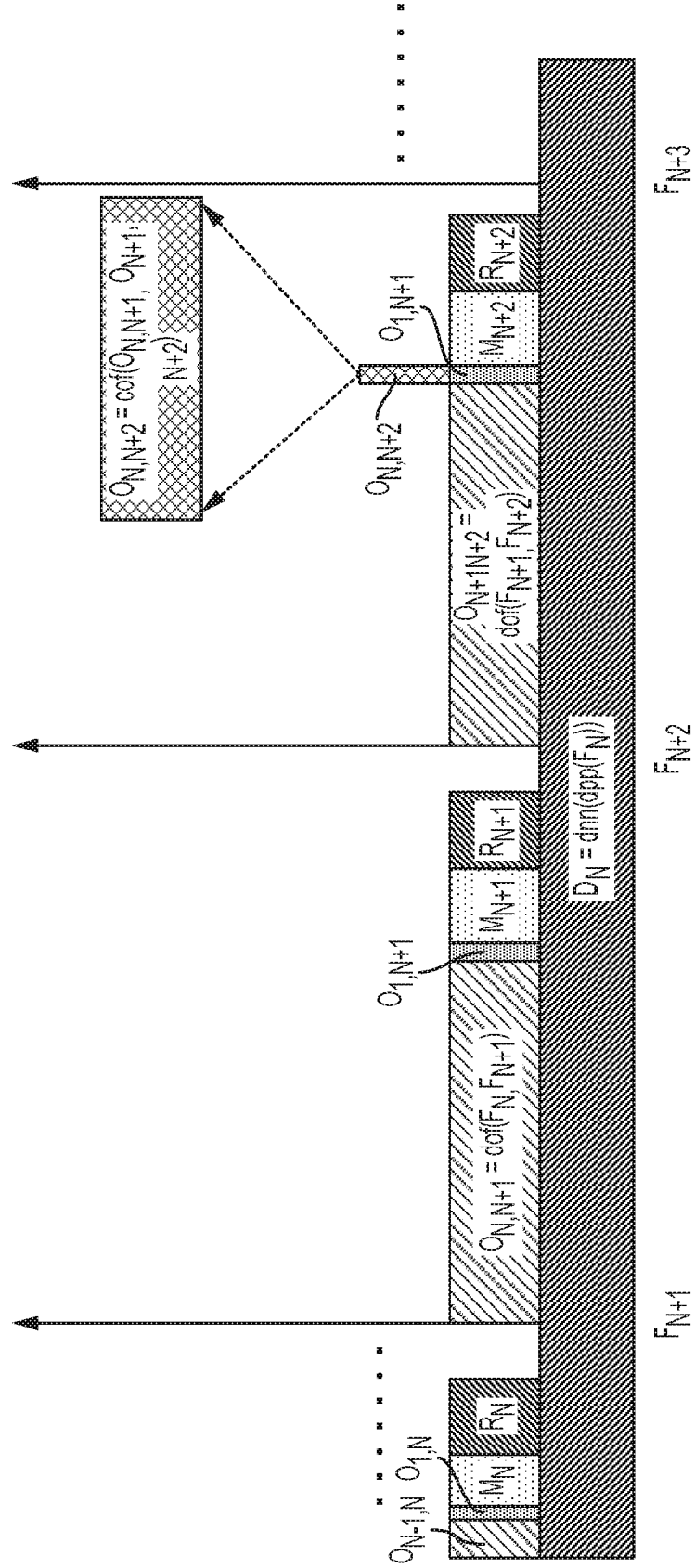
FIG. 6D is a timing diagram further illustrating an example of the image segmentation process described herein, in accordance with some examples.
Figure 6E:
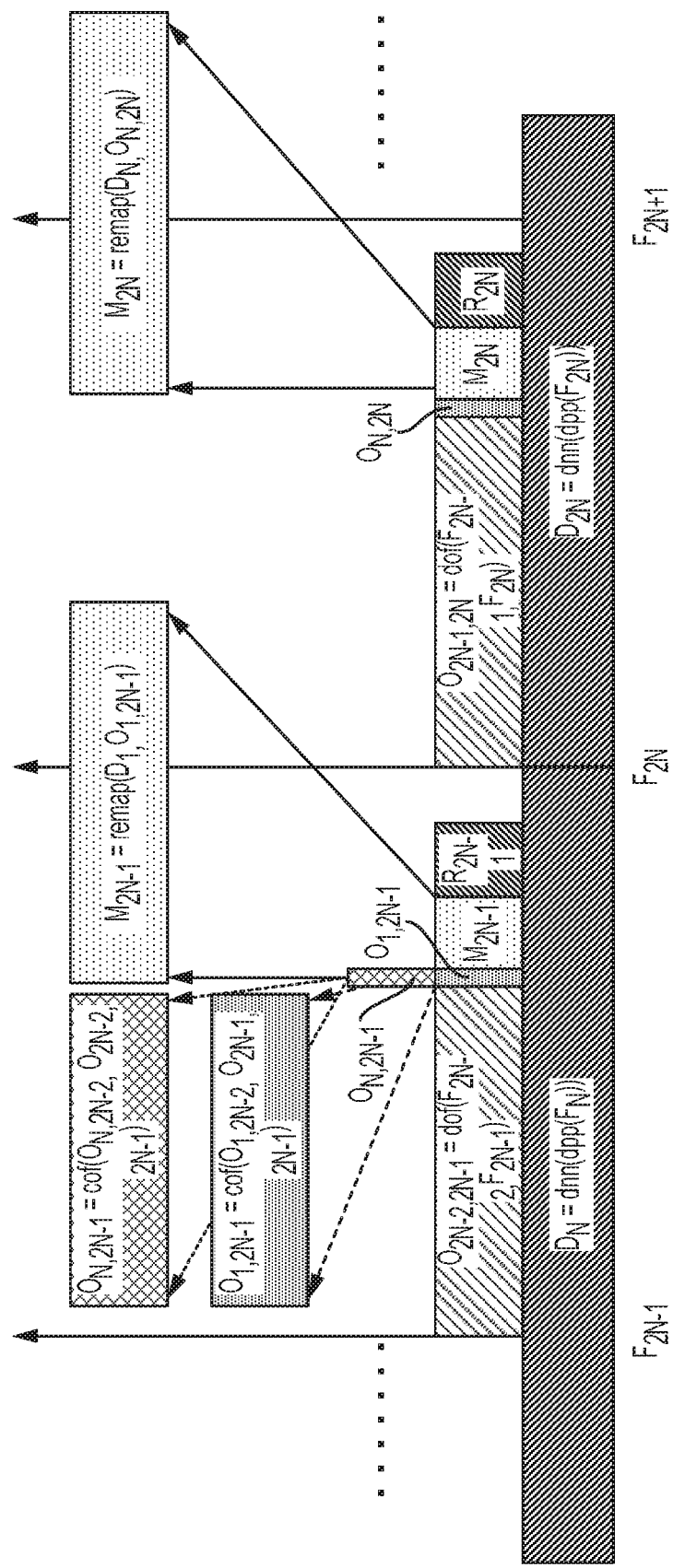
FIG. 6E is a timing diagram further illustrating an example of the image segmentation process described herein, in accordance with some examples.

As shown in FIG. 6C, FIG. 6D, and FIG. 6E, the image segmentation process continues as more frames are captured. At Frame N+1 ($F_{N+1}$), a dense optical flow ($O_{N,N+1}$) is computed between frames $F_N$ and $F_{N-1}$, and is used to compute a cumulative optical flow ($O_{1,N+1}$) between Frame 1 and Frame N+1. The cumulative optical flow $O_{1,N+1}$ is used to generate the adjusted segmentation mask $M_{N+1}$ for frame N+1. The adjusted segmentation mask $M_{N+1}$ can then be used by the rendering engine 110 to generate the rendered output image $R_{N+1}$, which can be output for display by the display of the computing device in real-time.

FIG. 6D is a timing diagram for Frame N+1 through Frame N+3 ($F_{N+3}$) of the sequence of frames. At Frame N+2 ($F_{N+2}$), a dense optical flow ($O_{N+1,N+2}$) is computed between Frames N+1 and N+2. The dense optical flow $O_{N+1,N+2}$ is used to compute a cumulative optical flow ($O_{1,N+2}$) between Frame 1 and Frame N+2. The cumulative optical flow $O_{1,N+2}$ is used to generate the adjusted segmentation mask $M_{N+2}$ for frame N+2, which can be used by the rendering engine 110 to generate the rendered output image $R_{N+2}$. The rendered output image $R_{N+2}$ can then be output for display by the display of the computing device in real-time.

As shown in FIG. 6D, the dense optical flow map $O_{N+1,N+2}$ is also used to compute an additional cumulative optical flow ($O_{N,N+2}$) from Frame N to Frame N+2 ($F_{N+2}$). For example, the cumulative optical flow map $O_{N,N+2}$ can be computed by summing the dense optical flow map $O_{N,N+1}$ and the dense optical flow map $O_{N+1,N+2}$. The additional cumulative optical flow map $O_{N,N+2}$ will be used for adjusting the inference segmentation mask $D_N$ that will be output at Frame 2N (shown in FIG. 6E). Starting from Frame N+2, the image segmentation system 102 can thus compute two cumulative optical flow maps at each frame, one for the currently generated segmentation mask, and one for the segmentation mask that will be generated at the next multiple of N frames (e.g., 2N, 3N, and so on).

FIG. 6E is a timing diagram for Frame 2N−1 ($F_{2N-1}$) through Frame 2N+1 ($F_{2N+1}$) of the sequence of frames. Two cumulative optical flow maps are determined at Frame 2N−1, including cumulative optical flow map $O_{1,2N-1}$ between Frame 1 and Frame 2N−1 and cumulative optical flow map $O_{N,2N-1}$ between Frame N and Frame 2N−1. At Frame 2N−1 (before the inference segmentation mask $D_N$ is completed), the inference segmentation mask $D_1$ is modified using the cumulative optical flow map $O_{1,2N-1}$ in order to generate the adjusted segmentation mask $M_{2N-1}$. At Frame 2N ($F_{2N}$), the inference segmentation mask $D_N$ is generated and output to the remapping engine 108. Also at Frame 2N, a cumulative optical flow map $O_{N,2N}$ between Frame N and Frame 2N is computed. At this point, computation of a cumulative optical flow map relative to Frame 1 (e.g., $O_{1,2N}$) is not needed, because the segmentation mask originating from Frame 1 is no longer needed.

The remapping engine 108 can adjust the new inference segmentation mask $D_N$ at Frame 2N using the cumulative optical flow map $O_{N,2N}$ to generate the modified segmentation mask $M_{2N}$ (which can be defined as $M_{2N}=\text{remap}(D_N, O_{N,2N})$). For example, the foreground pixels of the inference segmentation mask $D_N$ can be adjusted by moving the pixels to new locations using the cumulative optical flow vectors from $O_{N,2N}$, as described above with respect to FIG. 4A-FIG. 5B. The rendering engine 110 can generate a rendered output frame $R_{2N}$ using the input frame 2N ($F_{2N}$) and the adjusted segmentation mask $M_{2N}$. The rendered output frame $R_{2N}$ can be output for display by a display of the computing device. As shown, at Frame 2N, a new segmentation mask (denoted as $D_{2N}$) can begin to be generated by the segmentation engine 104 using Frame 2N as input. Beginning at Frame 2N+2 (not shown), the image segmentation system 102 can compute two cumulative optical flow maps at each frame, one for the currently generated segmentation mask ($D_{2N}$, $D_{2N+1}$, etc.), and one for the segmentation mask ($D_{3N}$, $D_{3N+1}$, etc.) that will be generated at Frame 3N. The image segmentation process can continue until the frames are no longer captured, until the segmentation is no longer needed (e.g., a function that uses the image segmentation is turned off), or until some other event occurs that causes the image segmentation process to no longer be needed.

Using the above-described image segmentation techniques, a segmentation mask and a rendered image can be generated in real-time (30 fps or higher fps) at each frame, marginalizing the delay required to produce an inference segmentation mask. Such image segmentation can be achieved without the need to reduce the complexity of a deep neural network that can be used for the segmentation, allowing real-time results to be achieved using highly complex and accurate neural network based image segmentations.

FIG. 7 is a flowchart illustrating an example of a process 700 of segmenting one or more frames using the image segmentation techniques described herein. At block 702, the process 700 includes determining incremental optical flow maps between adjacent frames of a plurality of frames. At block 704, the process 700 includes determining a cumulative optical flow map between a first frame of the plurality of frames and a last frame of the plurality of frames. The cumulative optical flow map can be determined using the incremental optical flow maps. The incremental optical flow maps and the cumulative optical flow map can include an optical flow vector for each pixel of the plurality of frames. For instance, each pixel of an incremental optical flow map can include a respective optical flow vector, and each pixel of a cumulative optical flow map can include a respective optical flow vector.

In one illustrative example, to determine the incremental optical flow maps, the process 700 can obtain a first frame, a second frame, and a third frame. The process 700 can determine a first optical flow map by determining optical flow vectors between pixels of the first frame and pixels of the second frame. The process 700 can also determine a second optical flow map by determining optical flow vectors between the pixels of the second frame and pixels of the third frame. Incremental optical flow maps can be determined between adjacent frames of the plurality of frames until a segmentation mask generated using the first frame is complete.

Continuing with the above illustrative example, to determine the cumulative optical flow map, the process 700 can determine cumulative optical flow vectors between the pixels of the first frame and the pixels of the third frame by computing a sum of the optical flow vectors between the pixels of the first frame and the pixels of the second frame and the optical flow vectors between the pixels of the second frame and the pixels of the third frame. In some examples, an incremental optical flow map is determined between each set of adjacent frames of the plurality of frames (e.g., as shown in FIG. 6A-FIG. 6E). In some examples, a cumulative optical flow map is determined at each frame of the plurality of frames following the second frame (e.g., as shown in FIG. 6B-FIG. 6E, starting at Frame 3).

At block 706, the process 700 includes determining a segmentation mask using the first frame of the plurality of frames. In some implementations, the segmentation mask is determined using a neural network trained to segment foreground pixels of a frame from background pixels of the frame. Foreground pixels can correspond to objects that are identified in a frame. For example, the neural network can be trained to classify certain objects in frames, in which case pixels corresponding to the classified objects can be referred to as foreground pixels, and all other pixels can be referred to as background pixels. In some examples, the process 700 may take the plurality of frames to determine the segmentation mask using the first frame of the plurality of frames. For example, in some cases, the segmentation mask can be completed using the first frame after receipt of last frame. In another example, the segmentation mask can be completed using the first frame after a frame preceding the last frame is processed. For instance, referring to FIG. 6C, the segmentation mask $D_1$ is completed after Frame N−1 ($F_{N-1}$) is processed, which is the frame prior to Frame N. As shown in FIG. 6, once the segmentation mask $D_1$ is generated, the remapping ($M_N$) and the rendering ($R_N$) can be performed after receipt of the frame N ($F_N$).

At block 708, the process 700 includes adjusting foreground pixels of the segmentation mask for the last frame of the plurality of frames relative to corresponding foreground pixels in the first frame. The foreground pixels can be adjusted using the cumulative optical flow map between the first frame and the last frame of the plurality of frames. In some cases, adjusting the foreground pixels of the segmentation mask includes remapping the foreground pixels of the segmentation mask to new pixel locations. The new pixel locations can be determined using optical flow vectors of the cumulative optical flow map, as previously described.

In some examples, the process 700 includes rendering an output frame. The foreground pixels of the output frame correspond to the adjusted foreground pixels of the segmentation mask. For example, each pixel of the output frame has a corresponding pixel in the segmentation mask. In some examples, background pixels of the output frame are modified. In some examples, the foreground pixels of the output frame are modified. In some examples, the background pixels and the foreground pixels of the output frame are modified.

In some examples, the process 700 includes updating the cumulative optical flow map between the first frame of the plurality of frames and a current frame. The updated cumulative optical flow map can be used to adjust the foreground pixels of the segmentation mask for the current frame. For example, referring to FIG. 6C, an updated cumulative optical flow map ($O_{1,N+1}$) is determined, and is used to generate the adjusted (or remapped) segmentation mask $M_{N+1}$ for the frame N+1 ($F_{N+1}$).

In some cases, the process 700 includes determining an additional cumulative optical flow map between the last frame of the plurality of frames and a current frame. The additional cumulative optical flow map can be used to adjust foreground pixels of an additional segmentation mask. The additional segmentation mask can be determined using the last frame of the plurality of frames. For example, referring to FIG. 6E, an additional cumulative optical flow map ($O_{N,2N}$) is determined, and is used to adjust (or remap) the segmentation mask $D_{2N}$ for the frame 2N ($F_{2N}$), in order to generate the adjusted segmentation mask $M_{2N}$.

In some examples, the process 700 can include updating the cumulative optical flow map between the first frame of the plurality of frames and a current frame, and determining an additional cumulative optical flow map between the last frame of the plurality of frames and the current frame. The additional cumulative optical flow map can be used to adjust foreground pixels of an additional segmentation mask, where the additional segmentation mask is determined using the last frame of the plurality of frames. In such examples, the cumulative optical flow map can be updated and the additional cumulative optical flow map can be determined in parallel for the current frame. For example, referring to FIG. 6E, an updated cumulative optical flow map ($O_{1,2N-1}$) and an additional cumulative optical flow map ($O_{N,2N-1}$) can be determined in parallel for frame 2N-1 ($F_{2N-1}$). In such an example, the updated cumulative optical flow map ($O_{1,2N-1}$) can be used to generate the adjusted (or remapped) segmentation mask $M_{2N-1}$ for the frame 2N-1 ($F_{2N-1}$). In such an example, the additional cumulative optical flow map ($O_{N,2N-1}$) can be used to generate the adjusted (or remapped) segmentation mask $M_{2N}$ for the next frame 2N ($F_{2N}$). For example, at the frame 2N ($F_{2N}$), the cumulative optical flow map $O_{N,2N-1}$ can be used to generate the updated optical flow map $O_{N,2N}$, which can then be used to generate the adjusted segmentation mask $M_{2N}$.

In some examples, the process 700 may be performed by a computing device or an apparatus, which can include the image segmentation system 102 shown in FIG. 1. In some cases, the computing device or apparatus may include a processor, microprocessor, microcomputer, or other component of a device that is configured to carry out the steps of process 700. In some examples, the computing device or apparatus may include one or more cameras configured to capture images and/or video data (e.g., a video sequence) including frames. For example, the computing device may include a mobile device with a camera (e.g., a digital camera, an IP camera, a mobile phone or tablet including a camera, or other type of device with a camera). In some cases, the computing device may include a display for displaying the output images or frames. In some cases, the computing device may include a video codec. In some examples, a camera or other capture device that captures the images and/or video data is separate from the computing device, in which case the computing device receives the captured video data. The computing device may further include a network interface configured to communicate the video data. The network interface may be configured to communicate Internet Protocol (IP) based data or other suitable network data.

Process 700 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10C:
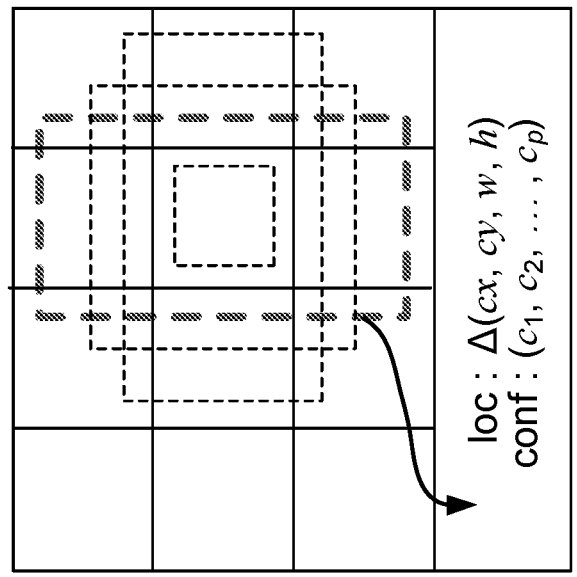
FIG. 10A-FIG. 10C are diagrams illustrating an example of a single-shot object detector, in accordance with some examples.

As described above, neural network-based image segmentation can be used by the segmentation engine 104 to segment frames. Any suitable neural network can be used to segment the frames. In some cases, the neural network can be a network designed to perform classification. Illustrative examples of deep neural networks that can be used include a convolutional neural network (CNN), an autoencoder, a deep belief net (DBN), a Recurrent Neural Networks (RNN), or any other suitable neural network. In one illustrative example, a MobileNet based neural network detector can be used by the segmentation engine. Other examples of deep network based detectors include a single-shot detector (SSD) (as described below with respect to FIG. 10A-FIG. 10C), a YOLO detector (as described below with respect to FIG. 11A-FIG. 11C), among other suitable detectors that operate using a complex neural network.

Figure 8:
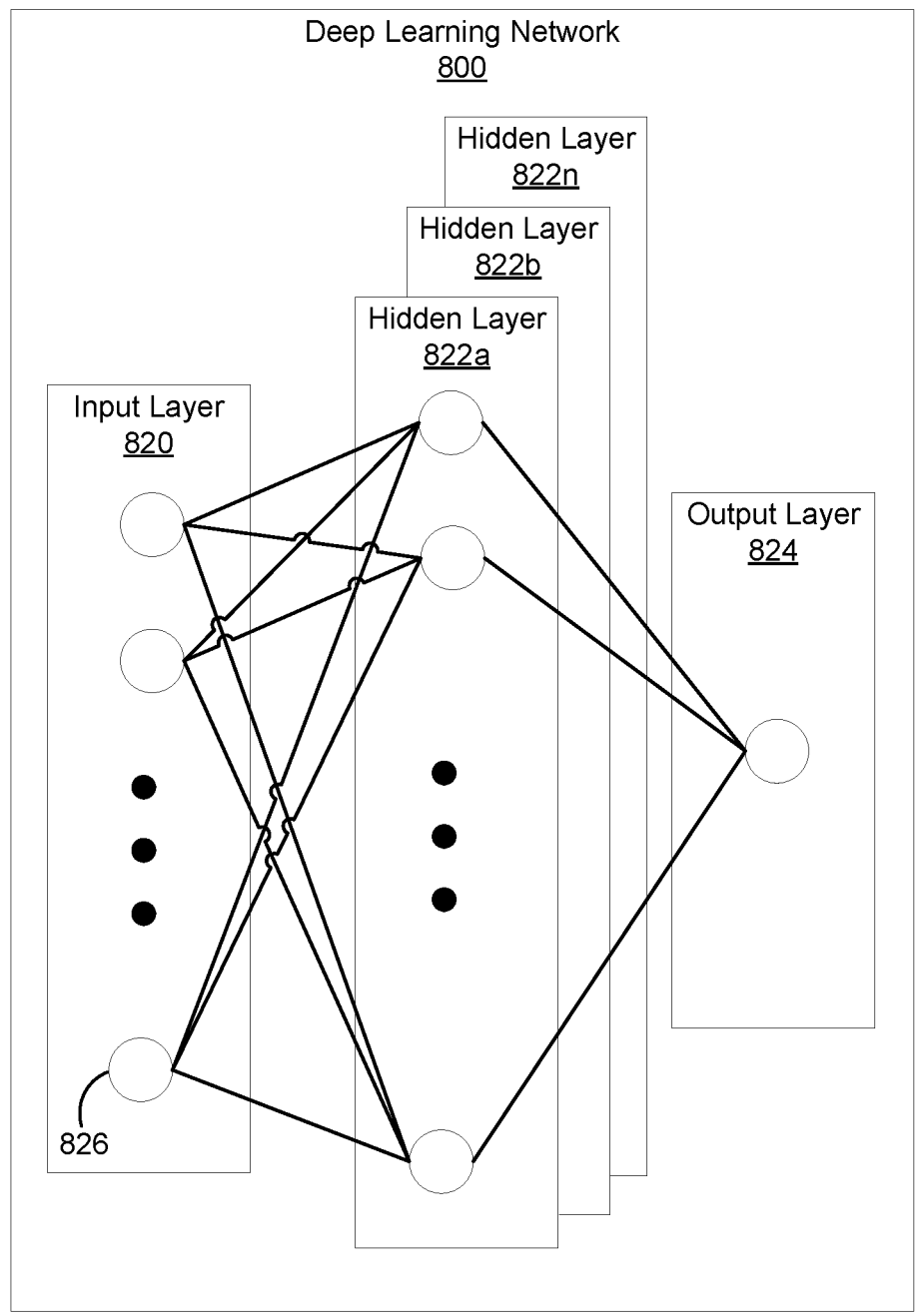
FIG. 8 is a block diagram illustrating an example of a deep learning network, in accordance with some examples.

FIG. 8 is an illustrative example of a deep learning neural network 800 that can be used by the segmentation engine 104. An input layer 820 includes input data. In one illustrative example, the input layer 820 can include data representing the pixels of an input video frame. The deep learning network 800 includes multiple hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The deep learning network 800 further includes an output layer 824 that provides an output resulting from the processing performed by the hidden layers 822a, 822b, through 822n. In one illustrative example, the output layer 824 can provide a classification and/or a localization for each object in an input video frame. The classification can include a class identifying the type of object (e.g., a person, a dog, a cat, or other object for which the network 800 is trained to classify). When trained to localize an object, a localization provided by the network 800 can include a bounding box indicating the location of an object.

The deep learning network 800 is a multi-layer neural network of interconnected nodes. Each node can represent a piece of information. Information associated with the nodes is shared among the different layers and each layer retains information as information is processed. In some cases, the deep learning network 800 can include a feed-forward network, in which case there are no feedback connections where outputs of the network are fed back into itself. In some cases, the network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the hidden layers 822a-n can transform the information of each input node by applying activation functions to these information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 824, at which an output is provided. In some cases, while nodes (e.g., node 826) in the deep learning network 800 are shown as having multiple output lines, a node has a single output and all lines shown as being output from a node represent the same output value.

In some cases, each node or interconnection between nodes can have a weight that is a set of parameters derived from the training of the deep learning network 800. For example, an interconnection between nodes can represent a piece of information learned about the interconnected nodes. The interconnection can have a tunable numeric weight that can be tuned (e.g., based on a training dataset), allowing the deep learning network 800 to be adaptive to inputs and able to learn as more and more data is processed.

The deep learning network 800 is pre-trained to process the features from the data in the input layer 820 using the different hidden layers 822a, 822b, through 822n in order to provide the output through the output layer 824. In an example in which the deep learning network 800 is used to identify objects in images, the network 800 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the deep neural network 800 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 800 is trained well enough so that the weights of the layers are accurately tuned.

For the example of identifying objects in images, the forward pass can include passing a training image through the network 800. The weights are initially randomized before the deep neural network 800 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the network 800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the network 800 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total} = \Sigma \frac{1}{2}(\text{target} - \text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The deep learning network 800 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The deep learning network 800 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The deep learning network 800 can include any other deep network other than a CNN, such as an autoencoder, a deep belief nets (DBNs), a Recurrent Neural Networks (RNNs), among others.

Figure 9:
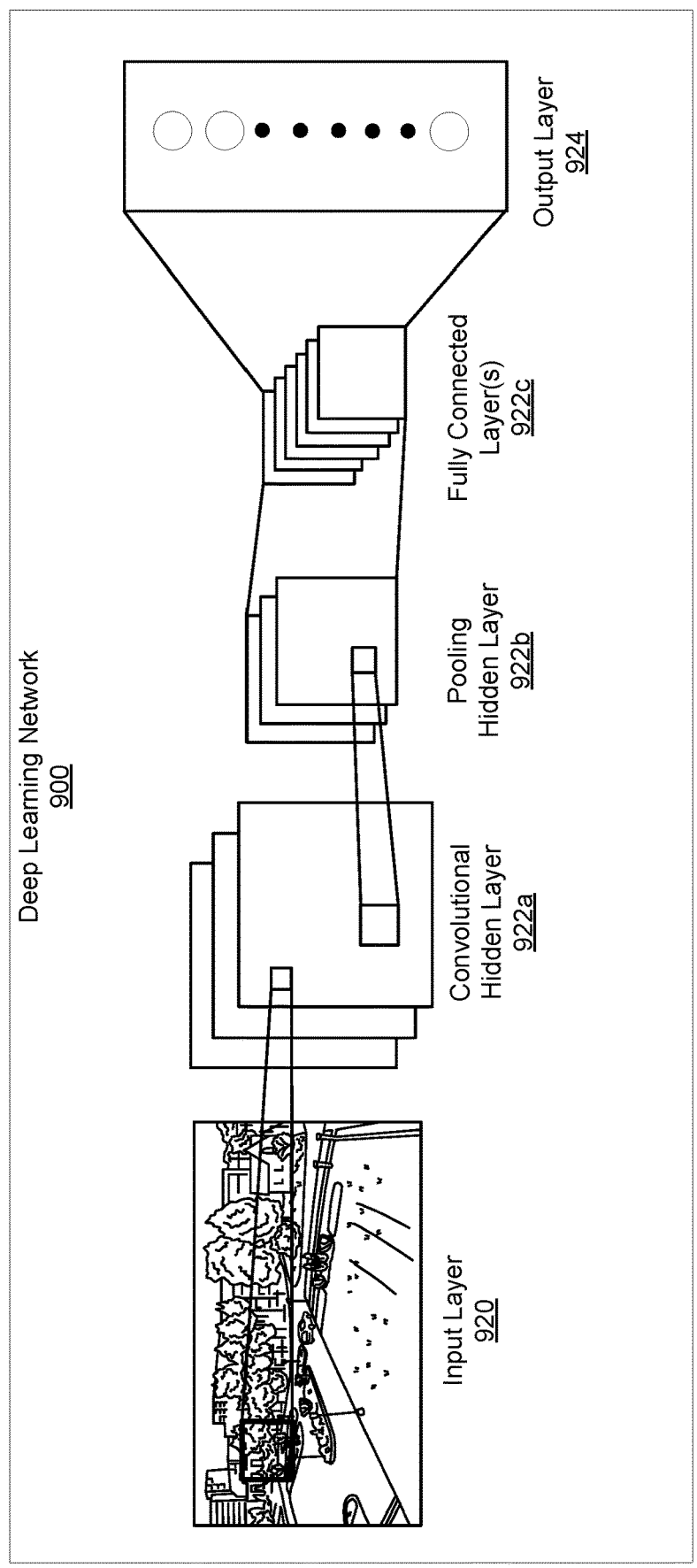
FIG. 9 is a block diagram illustrating an example of a convolutional neural network, in accordance with some examples.

FIG. 9 is an illustrative example of a convolutional neural network 900 (CNN 900). The input layer 920 of the CNN 900 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 922a, an optional non-linear activation layer, a pooling hidden layer 922b, and fully connected hidden layers 922c to get an output at the output layer 924. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a single class of an object or can include a probability of classes that best describe the object in the image. A class or probability of classes can be generated for each object in an image.

The first layer of the CNN 900 is the convolutional hidden layer 922a. The convolutional hidden layer 922a analyzes the image data of the input layer 920. Each node of the convolutional hidden layer 922a is connected to a region of nodes (pixels) of the input image called a receptive field. The convolutional hidden layer 922a can be considered as one or more filters (each filter corresponding to a different activation or feature map), with each convolutional iteration of a filter being a node or neuron of the convolutional hidden layer 922a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 922a. Each connection between a node and a receptive field for that node learns a weight and, in some cases, an overall bias such that each node learns to analyze its particular local receptive field in the input image. Each node of the hidden layer 922a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 922a is due to each node of the convolutional layer being applied to its corresponding receptive field. For example, a filter of the convolutional hidden layer 922a can begin in the top-left corner of the input image array and can convolve around the input image. As noted above, each convolutional iteration of the filter can be considered a node or neuron of the convolutional hidden layer 922a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 922a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 922a.

The mapping from the input layer to the convolutional hidden layer 922a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 922a can include several activation maps in order to identify multiple features in an image. The example shown in FIG. 9 includes three activation maps. Using three activation maps, the convolutional hidden layer 922a can detect three different kinds of features, with each feature being detectable across the entire image.

In some examples, a non-linear hidden layer can be applied after the convolutional hidden layer 922a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the network 900 without affecting the receptive fields of the convolutional hidden layer 922a.

The pooling hidden layer 922b can be applied after the convolutional hidden layer 922a (and after the non-linear hidden layer when used). The pooling hidden layer 922b is used to simplify the information in the output from the convolutional hidden layer 922a. For example, the pooling hidden layer 922b can take each activation map output from the convolutional hidden layer 922a and generates a condensed activation map (or feature map) using a pooling function. Max-pooling is one example of a function performed by a pooling hidden layer. Other forms of pooling functions be used by the pooling hidden layer 922a, such as average pooling, L2-norm pooling, or other suitable pooling functions. A pooling function (e.g., a max-pooling filter, an L2-norm filter, or other suitable pooling filter) is applied to each activation map included in the convolutional hidden layer 922a. In the example shown in FIG. 9, three pooling filters are used for the three activation maps in the convolutional hidden layer 922a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 922a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 922a having a dimension of 24×24 nodes, the output from the pooling hidden layer 922b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 922b to every one of the output nodes in the output layer 924. Using the example above, the input layer includes 28×28 nodes encoding the pixel intensities of the input image, the convolutional hidden layer 922a includes 3×24×24 hidden feature nodes based on application of a 5×5 local receptive field (for the filters) to three activation maps, and the pooling layer 922b includes a layer of 3×12×12 hidden feature nodes based on application of max-pooling filter to 2×2 regions across each of the three feature maps. Extending this example, the output layer 924 can include ten output nodes. In such an example, every node of the 3×12× 12 pooling hidden layer 922b is connected to every node of the output layer 924.

The fully connected layer 922c can obtain the output of the previous pooling layer 922b (which should represent the activation maps of high-level features) and determines the features that most correlate to a particular class. For example, the fully connected layer 922c layer can determine the high-level features that most strongly correlate to a particular class, and can include weights (nodes) for the high-level features. A product can be computed between the weights of the fully connected layer 922c and the pooling hidden layer 922b to obtain probabilities for the different classes. For example, if the CNN 900 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 924 can include an M-dimensional vector (in the prior example, M=10), where M can include the number of classes that the program has to choose from when classifying each object in the image. Other example outputs can also be provided. Each number in the N-dimensional vector can represent the probability an object is of a certain class. In one illustrative example, if a 10-dimensional output vector represents ten different classes of objects is [0 0 0.05 0.8 0 0.15 0 0 0 0], the vector indicates that there is a 5% probability that an object in the image is the third class of object (e.g., a dog), an 80% probability that the object in the image is the fourth class of object (e.g., a human), and a 15% probability that the object in the image is the sixth class of object (e.g., a kangaroo). The probability for a class can be considered a confidence level that the object is part of that class.

As previously noted, the segmentation engine 104 can use any suitable neural network. One example includes a MobileNet based classification network. MobileNet is an architecture that uses depthwise separable convolutions. For example, a normal convolution performed by some neural networks is replaced by the depthwise separable convolution. A depthwise separable convolution includes a depthwise convolution followed by a pointwise convolution. For example, assuming an input feature map has a dimension of Hi, Wi, Ci (height, width, input channel depth), Co feature maps are desired in the resulting feature map, and the convolution kernel size is K, then there are Ci convolution kernels (one for each input channel) with dimension K, K, 1. The resulting feature map has a dimension of Ho, Wo, Ci after the depthwise convolution. The depthwise convolution is followed by a pointwise convolution (e.g., a 1×1 convolution). The pointwise convolution kernel is of dimension 1, 1, Ci and there are Co different kernels, resulting in the feature map of Ho, Wo, Co dimension.

Using depthwise separable convolutions can significantly reduce the number of parameters that are used (as compared with a network that uses normal convolutions with the same depth in the networks), resulting in lightweight deep neural networks that can be beneficial in mobile and embedded based vision applications. Because the number of parameters is reduced, the number of floating point multiplication operations is also reduced, which is favorable in mobile and embedded vision applications that have less computing power than other devices.

Figure 10B:
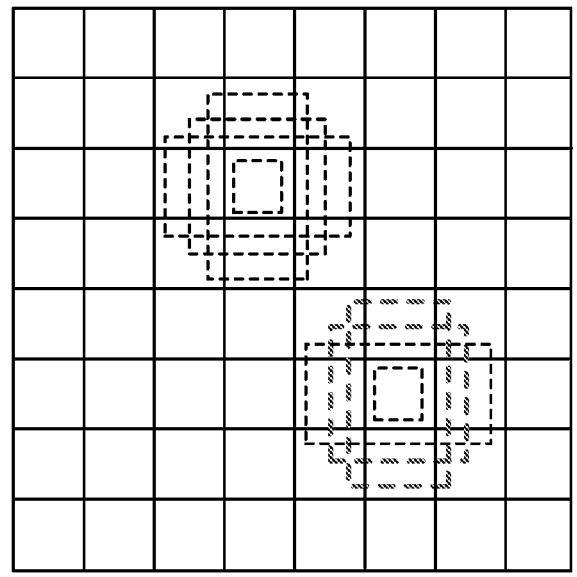
Figure 10A:
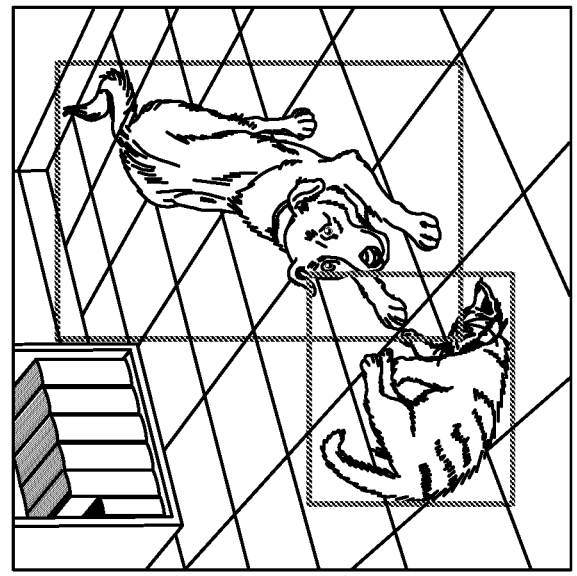

Another deep learning-based network that can be used by the segmentation engine 104 to segment frames includes the SSD detector, which is a fast single-shot object detector that can be applied for multiple object categories or classes. The SSD model uses multi-scale convolutional bounding box outputs attached to multiple feature maps at the top of the neural network. Such a representation allows the SSD to efficiently model diverse box shapes. FIG. 10A includes an image and FIG. 10B and FIG. 10C include diagrams illustrating how an SSD detector (with the VGG deep network base model) operates. For example, SSD matches objects with default boxes of different aspect ratios (shown as dashed rectangles in FIG. 10B and FIG. 10C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (shown in blue in FIG. 10B) are matched with the cat, and one of the 4×4 boxes (shown in red in FIG. 10C) is matched with the dog. SSD has multiple features maps, with each feature map being responsible for a different scale of objects, allowing it to identify objects across a large range of scales. For example, the boxes in the 8×8 feature map of FIG. 10B are smaller than the boxes in the 4×4 feature map of FIG. 10C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 10A, all probability labels would indicate the background class with the exception of the three matched boxes (two for the cat, one for the dog).

Figure 11C:
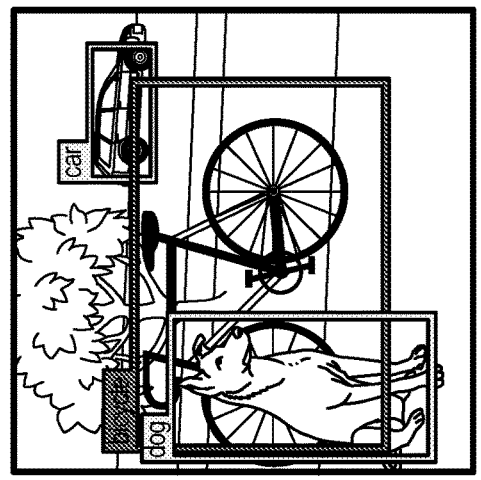
FIG. 11A-FIG. 11C are diagrams illustrating an example of a you only look once (YOLO) detector, in accordance with some examples.
Figure 11B:
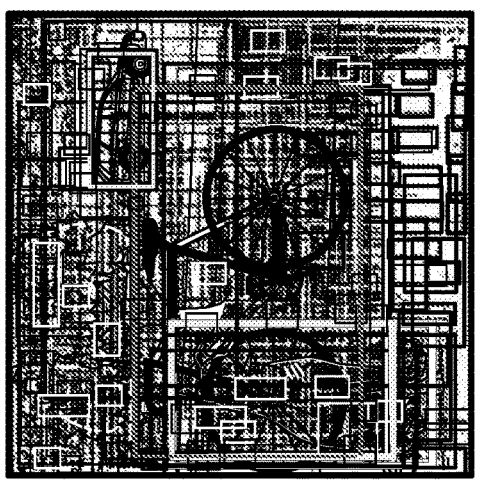
Figure 11A:
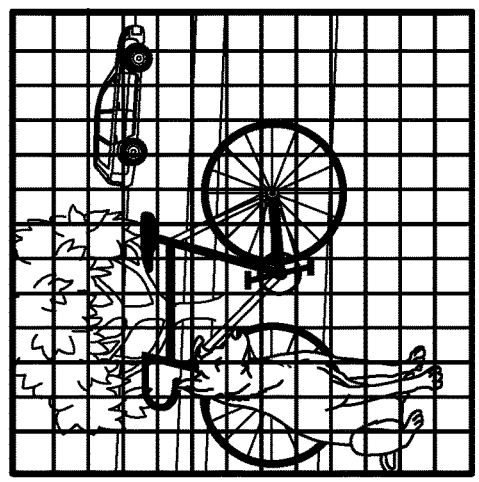

Another deep learning-based network that can be used by the segmentation engine 104 to segment frames includes the You only look once (YOLO) detector, which is an alternative to the SSD object detection system. FIG. 11A includes an image and FIG. 11B and FIG. 11C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 11A, the YOLO detector divides up the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 11B. The boxes with higher confidence scores have thicker borders.

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the yellow box with thick borders on the left side of the image in FIG. 11B is 85% sure it contains the object class "dog." There are 169 grid cells (13×13) and each cell predicts 5 bounding boxes, resulting in 845 bounding boxes in total. Many of the bounding boxes will have very low scores, in which case only the boxes with a final score above a threshold (e.g., above a 30% probability, 40% probability, 50% probability, or other suitable threshold) are kept. FIG. 11C shows an image with the final predicted bounding boxes and classes, including a dog, a bicycle, and a car. As shown, from the 845 total bounding boxes that were generated, only the three bounding boxes shown in FIG. 11C were kept because they had the best final scores.

The image segmentation operations discussed herein may be implemented using compressed frames or using uncompressed frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example, the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of segmenting one or more frames, the method comprising:
   initiating generation of a segmentation mask for a first frame of a plurality of frames;
   determining incremental optical flow maps between adjacent frames of the plurality of frames;
   determining, as the segmentation mask is being generated, a cumulative optical flow map between the first frame of the plurality of frames and a last frame of the plurality of frames, the cumulative optical flow map being updated using the incremental optical flow maps at each frame of the plurality of frames following a second frame;
determining the generation of the segmentation mask is complete at a time corresponding to the last frame of the plurality of frames; and
adjusting foreground pixels of the segmentation mask for the last frame of the plurality of frames relative to corresponding foreground pixels in the first frame, the foreground pixels being adjusted using the cumulative optical flow map between the first frame and the last frame of the plurality of frames.

2. The method of claim 1, wherein determining the incremental optical flow maps includes:
obtaining the first frame, the second frame, and a third frame of the plurality of frames;
determining a first optical flow map by determining optical flow vectors between pixels of the first frame and pixels of the second frame; and
determining a second optical flow map by determining optical flow vectors between the pixels of the second frame and pixels of the third frame.

3. The method of claim 2, wherein determining the cumulative optical flow map includes:
determining cumulative optical flow vectors between the pixels of the first frame and the pixels of the third frame by computing a sum of the optical flow vectors between the pixels of the first frame and the pixels of the second frame and the optical flow vectors between the pixels of the second frame and the pixels of the third frame.

4. The method of claim 2, wherein an incremental optical flow map is determined between each set of adjacent frames of the plurality of frames.

5. The method of claim 1, wherein the segmentation mask is determined using a neural network trained to segment foreground pixels of a frame from background pixels of the frame.

6. The method of claim 1, wherein adjusting the foreground pixels of the segmentation mask includes remapping the foreground pixels of the segmentation mask to new pixel locations, the new pixel locations being determined using optical flow vectors of the cumulative optical flow map.

7. The method of claim 1, wherein the incremental optical flow maps and the cumulative optical flow map include an optical flow vector for each pixel of the plurality of frames.

8. The method of claim 1, further comprising rendering an output frame, wherein foreground pixels of the output frame correspond to the adjusted foreground pixels of the segmentation mask.

9. The method of claim 8, wherein background pixels of the output frame are modified.

10. The method of claim 8, wherein the foreground pixels of the output frame are modified.

11. The method of claim 1, further comprising updating the cumulative optical flow map between the first frame of the plurality of frames and a current frame, wherein the updated cumulative optical flow map is used to adjust the foreground pixels of the segmentation mask for the current frame.

12. The method of claim 1, further comprising determining an additional cumulative optical flow map between the last frame of the plurality of frames and a current frame, the additional cumulative optical flow map being used to adjust foreground pixels of an additional segmentation mask, wherein the additional segmentation mask is determined using the last frame of the plurality of frames.

13. The method of claim 1, further comprising:
updating the cumulative optical flow map between the first frame of the plurality of frames and a current frame received after the last frame of the plurality of frames; and
determining an additional cumulative optical flow map between the last frame of the plurality of frames and the current frame.

14. The method of claim 13, wherein the cumulative optical flow map is updated and the additional cumulative optical flow map is determined in parallel for the current frame.

15. An apparatus for segmenting one or more frames, comprising:
a memory configured to store data corresponding to the one or more frames; and
a processor configured to:
initiate generation of a segmentation mask for a first frame of a plurality of frames;
determine incremental optical flow maps between adjacent frames of a plurality of frames;
determine, as the segmentation mask is being generated, a cumulative optical flow map between the first frame of the plurality of frames and a last frame of the plurality of frames, the cumulative optical flow map being updated using the incremental optical flow maps at each frame of the plurality of frames following a second frame;
determine the generation of the segmentation mask is complete at a time corresponding to the last frame of the plurality of frames; and
adjust foreground pixels of the segmentation mask for the last frame of the plurality of frames relative to corresponding foreground pixels in the first frame, the foreground pixels being adjusted using the cumulative optical flow map between the first frame and the last frame of the plurality of frames.

16. The apparatus of claim 15, wherein determining the incremental optical flow maps includes:
obtaining the first frame, the second frame, and a third frame of the plurality of frames;
determining a first optical flow map by determining optical flow vectors between pixels of the first frame and pixels of the second frame; and
determining a second optical flow map by determining optical flow vectors between the pixels of the second frame and pixels of the third frame.

17. The apparatus of claim 16, wherein determining the cumulative optical flow map includes:
determining cumulative optical flow vectors between the pixels of the first frame and the pixels of the third frame by computing a sum of the optical flow vectors between the pixels of the first frame and the pixels of the second frame and the optical flow vectors between the pixels of the second frame and the pixels of the third frame.

18. The apparatus of claim 16, wherein an incremental optical flow map is determined between each set of adjacent frames of the plurality of frames.

19. The apparatus of claim 15, wherein the segmentation mask is determined using a neural network trained to segment foreground pixels of a frame from background pixels of the frame.

20. The apparatus of claim 15, wherein adjusting the foreground pixels of the segmentation mask includes remapping the foreground pixels of the segmentation mask to new pixel locations, the new pixel locations being determined using optical flow vectors of the cumulative optical flow map.

21. The apparatus of claim 15, wherein the incremental optical flow maps and the cumulative optical flow map include an optical flow vector for each pixel of the plurality of frames.

22. The apparatus of claim 15, wherein the processor is further configured to render an output frame, and wherein foreground pixels of the output frame correspond to the adjusted foreground pixels of the segmentation mask.

23. The apparatus of claim 22, wherein background pixels of the output frame are modified.

24. The apparatus of claim 22, wherein the foreground pixels of the output frame are modified.

25. The apparatus of claim 15, wherein the processor is further configured to:
update the cumulative optical flow map between the first frame of the plurality of frames and a current frame, wherein the updated cumulative optical flow map is used to adjust the foreground pixels of the segmentation mask for the current frame.

26. The apparatus of claim 15, wherein the processor is further configured to:
determine an additional cumulative optical flow map between the last frame of the plurality of frames and a current frame, the additional cumulative optical flow map being used to adjust foreground pixels of an additional segmentation mask, wherein the additional segmentation mask is determined using the last frame of the plurality of frames.

27. The apparatus of claim 15, wherein the apparatus comprises a mobile device.

28. The apparatus of claim 27, further comprising one or more of a camera for capturing the one or more frames and a display for displaying one or more output frames.

29. The apparatus of claim 15, wherein the time corresponding to the last frame of the plurality of frames is a time at which the last frame is received.

30. The apparatus of claim 15, wherein the time corresponding to the last frame of the plurality of frames is a time at which the last frame is processed for incorporation into the cumulative optical flow map.

31. The apparatus of claim 15, wherein an amount of time between initiating the generation of the segmentation mask and completing the generation of the segmentation mask corresponds to an amount of time between receiving the first frame of the plurality of frames and receiving the last frame of the plurality of frames.

\* \* \* \* \*